United States Patent [19]
Wang et al.

[11] Patent Number: 5,880,453
[45] Date of Patent: Mar. 9, 1999

[54] READER SYSTEM FOR REMOVABLE TWO DIMENSIONAL CODE

[75] Inventors: Ynjiun P. Wang, Stony Brook; Jerome Swartz, Old Field; Daniel R. McGlynn, Brooklyn, all of N.Y.

[73] Assignee: Symbol Technologies, Inc., Holtsville, N.Y.

[21] Appl. No.: 966,809

[22] Filed: Nov. 10, 1997

Related U.S. Application Data

[63] Continuation of Ser. No. 702,867, Aug. 26, 1996, abandoned, which is a continuation of Ser. No. 453,099, May 30, 1995, abandoned, which is a division of Ser. No. 250,348, May 27, 1994, Pat. No. 5,489,158, which is a continuation-in-part of Ser. No. 461,881, Jan. 5, 1990, Pat. No. 5,304,786, and a continuation of Ser. No. 903,222, Jun. 25, 1992, abandoned, which is a continuation-in-part of Ser. No. 851,505, Mar. 16, 1992, Pat. No. 5,243,655, which is a continuation-in-part of Ser. No. 653,822, Feb. 11, 1991, Pat. No. 5,113,445, which is a continuation of Ser. No. 550,023, Jul. 9, 1990, abandoned.

[51] Int. Cl.⁶ ..................................................... G06K 7/10
[52] U.S. Cl. ................................ 235/462.01; 235/467.32
[58] Field of Search ..................................... 235/437, 462, 235/487

[56] References Cited

U.S. PATENT DOCUMENTS

| | | |
|---|---|---|
| 2,634,220 | 4/1953 | Oriel . |
| 3,112,151 | 11/1963 | Buros . |
| 3,242,517 | 3/1966 | Buros et al. . |
| 3,293,650 | 12/1966 | Buros . |
| 3,573,432 | 4/1971 | Murray ..................................... 235/437 |
| 3,647,275 | 3/1972 | Ward . |
| 3,676,644 | 7/1972 | Vaccaro et al. . |
| 3,761,683 | 9/1973 | Rogers . |
| 3,780,271 | 12/1973 | Sharkitt et al. .......................... 235/437 |
| 3,780,846 | 12/1973 | Kokper et al. . |

(List continued on next page.)

FOREIGN PATENT DOCUMENTS

| | | |
|---|---|---|
| 27-21490 | 12/1977 | Germany . |
| 52-0043336 | 4/1977 | Japan ..................................... 235/437 |
| 55-0115166 | 9/1980 | Japan ..................................... 235/462 |
| 59-44157 | 3/1984 | Japan . |
| 62-91075 | 5/1987 | Japan . |
| 62-160600 | 7/1987 | Japan . |
| 32-78984 | 11/1988 | Japan . |
| 40-1095082 | 4/1989 | Japan . |
| 40-3286879 | 12/1991 | Japan . |
| 40-4142970 | 5/1992 | Japan . |

OTHER PUBLICATIONS

Wang et al., "Postal Applications of a High Density Bar code", Sep. 1990.

Ynjiun P. Wang, "PDF417 Specification", 1991 Symbol Technologies, Inc. Submitted to Aimis Technical Symbology Committe for Review.

Primary Examiner—Anita Pellman Gross
Assistant Examiner—Karl Frech
Attorney, Agent, or Firm—Finnegan, Henderson, Farabow, Garrett & Dunner, L.L.P.

[57] ABSTRACT

A bar code reader system includes a record, a bar code reader, a decoder, a processor, a transferring element, and a printer. The record includes a substrate with an information area containing first data removably encoded on the substrate in an error-correctable machine readable format and text. The bar code reader converts the first encoded data from the record into electrical signals which are decoded by the decoder. The processor encodes second data entered through a keyboard, and generates transfer drive signals for controlling the transfer of the second encoded data onto the record. The transferring element detects the presence of the first encoded data on the record, and in response to the drive signals when the first encoded data is present on the record, subjects the record to an erasing operation to remove the first encoded data. The printer then prints the second encoded data on the record.

23 Claims, 18 Drawing Sheets

U.S. PATENT DOCUMENTS

| | | |
|---|---|---|
| 3,812,328 | 5/1974 | Tramposch . |
| 3,862,806 | 1/1975 | Brown . |
| 3,932,840 | 1/1976 | Hanchett ................................ 235/437 |
| 4,097,290 | 6/1978 | Muller et al. . |
| 4,115,602 | 9/1978 | Ballard . |
| 4,188,139 | 2/1980 | Pasini et al. . |
| 4,224,508 | 9/1980 | Kao ....................................... 235/437 |
| 4,374,626 | 2/1983 | Hooker . |
| 4,409,470 | 10/1983 | Shepard et al. . |
| 4,641,346 | 2/1987 | Clark et al. . |
| 4,654,718 | 3/1987 | Sueyoshi . |
| 4,654,793 | 3/1987 | Elrod . |
| 4,660,221 | 4/1987 | Dlugos . |
| 4,699,531 | 10/1987 | Ulinski, Sr. et al. . |
| 4,734,713 | 3/1988 | Sato . |
| 4,739,377 | 4/1988 | Allen . |
| 4,786,195 | 11/1988 | Hibino et al. . |
| 4,794,239 | 12/1988 | Allais . |
| 4,834,567 | 5/1989 | Ueno . |
| 4,835,713 | 5/1989 | Pastor . |
| 4,863,196 | 9/1989 | Ohnishi et al. . |
| 4,893,333 | 1/1990 | Baran et al. . |
| 4,908,873 | 3/1990 | Philibert et al. . |
| 4,949,381 | 8/1990 | Pastor . |
| 4,952,785 | 8/1990 | Kikuda . |
| 4,973,829 | 11/1990 | Ishida . |
| 4,975,948 | 12/1990 | Andresen et al. . |
| 5,021,975 | 6/1991 | Yamanashi . |
| 5,070,504 | 12/1991 | Bossen et al. ............................ 371/54 |
| 5,113,445 | 5/1992 | Wang . |
| 5,121,432 | 6/1992 | Gilham et al. . |
| 5,248,856 | 9/1993 | Mallicoat . |
| 5,252,987 | 10/1993 | Eid et al. . |
| 5,304,786 | 4/1994 | Davlidis et al. . |
| 5,337,361 | 8/1994 | Wang et al. ............................... 380/51 |
| 5,396,054 | 3/1995 | Krichever et al. ..................... 235/462 |
| 5,412,194 | 5/1995 | Melbye et al. .......................... 235/437 |
| 5,607,063 | 3/1997 | Nishijima et al. ...................... 209/584 |

| PDF 417 SECURITY LEVEL ||
| --- | --- |
| SECURITY LEVEL | ERROR CORRECTION CODEWORDS |
| 0 | 0 |
| 1 | 2 |
| 2 | 6 |
| 3 | 14 |
| 4 | 30 |
| 5 | 62 |
| 6 | 126 |
| 7 | 254 |
| 8 | 510 |

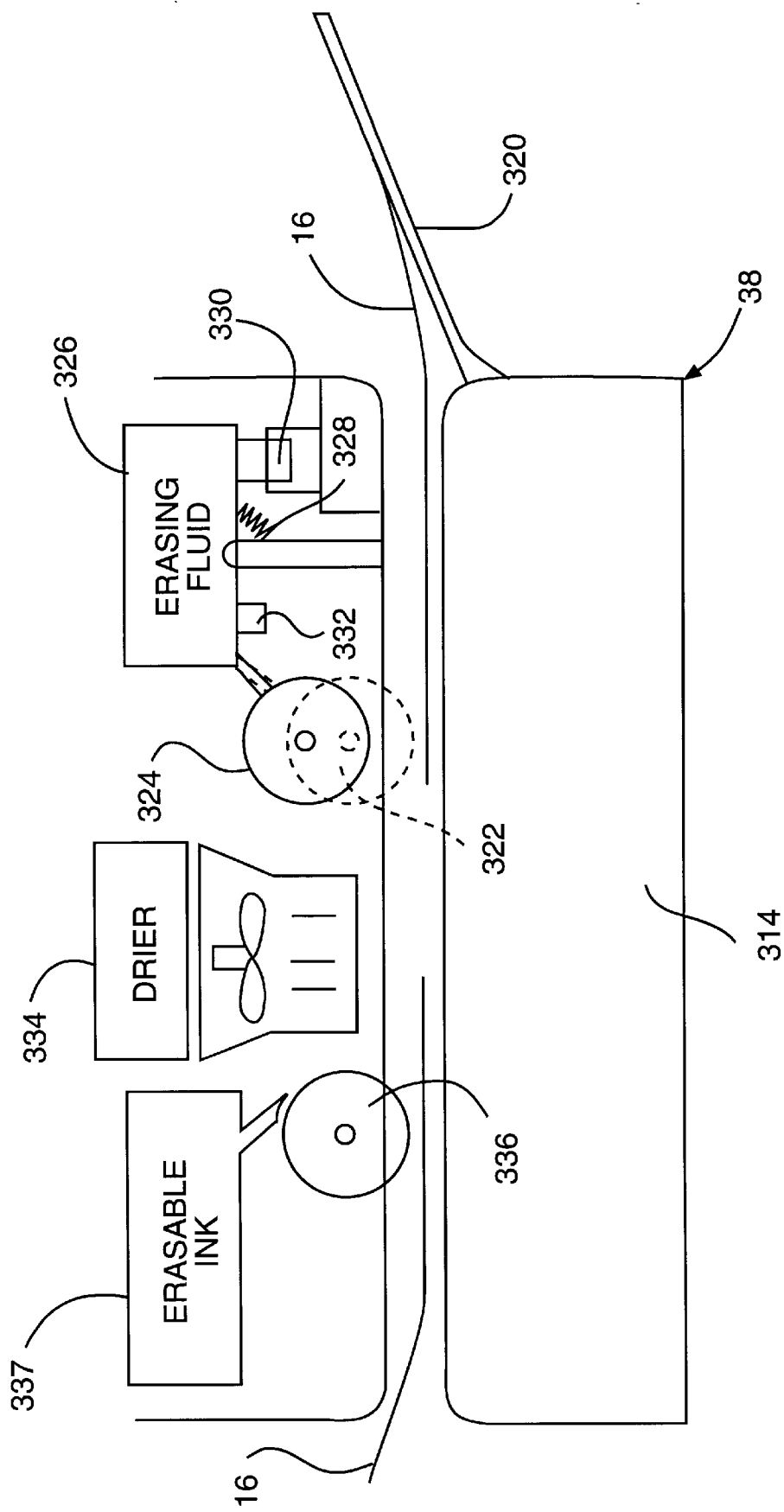

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |
| WEIGHT | H | H | H | M |  | L |  | M | H | H |

FIG. 14 B

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |
| WEIGHT | H | H | H | M |  | L |  | M | H | H |
| ROW | 2 | 2 | 2 | 2 |  | 1 |  | 1 | 1 | 1 |

FIG. 14C

READER SYSTEM FOR REMOVABLE TWO DIMENSIONAL CODE

This application is a continuation of application Ser. No. 08/702,867, filed Aug. 26, 1996, now abandoned; which is a continuation of application Ser. No. 08/453,099, filed May 30, 1995, now abandoned; which is a divisional application of Ser. No. 08/250,348, filed May 27, 1994, now U.S. Pat. No. 5,489,158; which is a continuation-in-part of application Ser. No. 07/461,881, filed Jan. 5, 1990, now U.S. Pat. No. 5,304,786; and a continuation of application Ser. No. 07/903,222, filed Jun. 25, 1992, now abandoned; which in turn is a continuation-in-part of application Ser. No. 07/851,505, filed Mar. 16, 1992, now U.S. Pat. 5,243,655; which is a continuation-in-part of application Ser. No. 07/653,822, filed Feb. 11, 1991, now U.S. Pat. 5,113,445; which is a continuation application of Ser. No. 07/550,023, filed Jul. 9, 1990, now abandoned, all of which are incorporated by reference.

BACKGROUND OF THE INVENTION

FIELD OF THE INVENTION

The use of encoded data placed on certain types of records is advantageous in that a large amount of information can be placed in a relatively small area. Also, encoded information can be kept confidential and revealed only to persons having the appropriate decoding apparatus.

Prior to the present invention, the only type of records that could best utilize the benefits of having encoded data placed thereon were records where the data did not change over the life of the record; or where there were relatively large time gaps before the record or such encoded data became outdated. Such records, which include price tags, package identifiers, or train car identifiers for example, did not require frequent updating of the data. Another alternative was to make the record large enough to accommodate additional encoded data representations for supplementing the information from time to time.

There are several types of records where the benefits of having encoded data thereon were offset by the necessity of frequent updating of the encoded information. For example, health cards and records could beneficially include encoded data because they required large amounts of necessary information and the need for confidentiality. Charge cards, where the remaining available credit could be printed on the card as each purchase is made, could beneficially include encoded data. Admission tickets useful for multiple events could include the used or unused events as encoded data on the ticket. This would include tickets for seminars with several workshops, or an admission ticket to an amusement park that includes several rides and shows. In all of the above instances, the necessity of frequent updating of the encoded information would either result in an oversized cumbersome record, or the frequent replacement of the record with a new record having updated encoded data.

SUMMARY OF THE INVENTION

It is, therefore, an object of this invention to provide a record having encoded data which can be updated without providing a new record.

Another object of the present invention is to provide a record having encoded data thereon which does not require additional area to add updated encoded data thereto.

A further object of the present invention is to provide a system and related method of making a record that does not require additional area or the making of a new record each time encoded data thereon requires changing.

Additional objects and advantages of this invention will be set forth in part in the description which follows, and in part will be obvious from that description, or may be learned by practice of this invention. The advantages of this invention may be realized and attained by means of the instrumentalities and combinations particularly pointed out in the appended claims.

To achieve the objects and in accordance with the purpose of the invention, as embodied and broadly described herein, a record according to this invention contains a printed portion placed on the record and an information portion including removable information encoded in an error-correctable, machine-readable format.

A printer system according to this invention for a record containing text in at least a portion thereof, comprises input means for receiving information to be placed onto the record; encoding means, coupled to the input means, for encoding the received information in an error-correctable, machine-readable format; and output means, coupled to the coding means, including means for removing any encoded information other than the received information from a record, and means for removably placing the encoded information on the record.

A reader system according to this invention for a record having an information area containing removable information encoded in an error-correctable format and text, comprises reading means for extracting the information from the information area; correction means, coupled to the reading means, for performing error correction on the removable information to correct any errors in the extracted information and output.

The accompanying drawings, which are incorporated in and constitute a part of the specification, illustrate embodiments of the invention and, together with the general description, serve to explain the principles of the invention.

BRIEF DESCRIPTION OF THE DRAWINGS

FIG. 5B is a schematic diagram of a printer used in making a record in accordance with the present invention;

FIG. 12 is a diagram illustrating the various width measurements that are used for the "t-sequence" of a codeword;

FIGS. 14A, 14B, and 14C are diagrams showing an example of a codeword vector;

DESCRIPTION OF THE PREFERRED EMBODIMENTS

Reference will now be made in detail to presently preferred embodiments of the invention, examples of which are illustrated in the accompanying drawings.

Figure 1A:
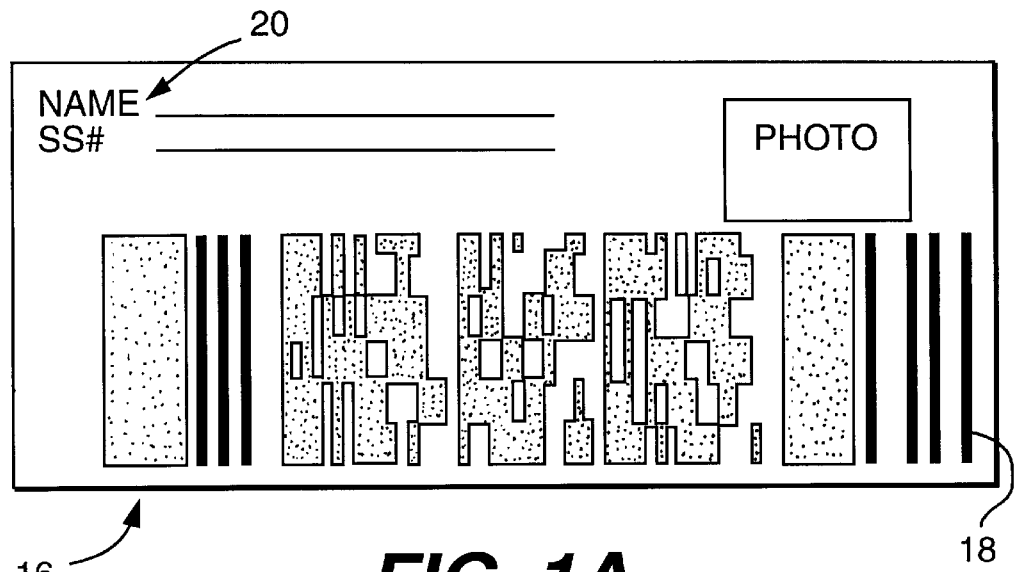
FIG. 1A is a diagram of a medical record with an erasable two-dimensional bar code used in connection with text and photo in accordance with one embodiment of the invention.

In one embodiment, the encoded information on a record is printed in erasable ink. In FIG. 1, a health card 16 includes a photograph and human readable text permanently disposed thereon with a two-dimensional code 18 printed thereon in erasable ink. The advantages of a two-dimensional code are that a) it is compact, b) it can hold a large amount of data, c) it is error correctable, and d) it maintains privacy. The two-dimensional code, preferably the PDF417 code described below, can include voluminous vital statistics relating to the individuals health. When health conditions change, the erasable ink is removed, and updated encoded information is printed in erasable ink in place of the previous two-dimensional code.

Figure 1B:
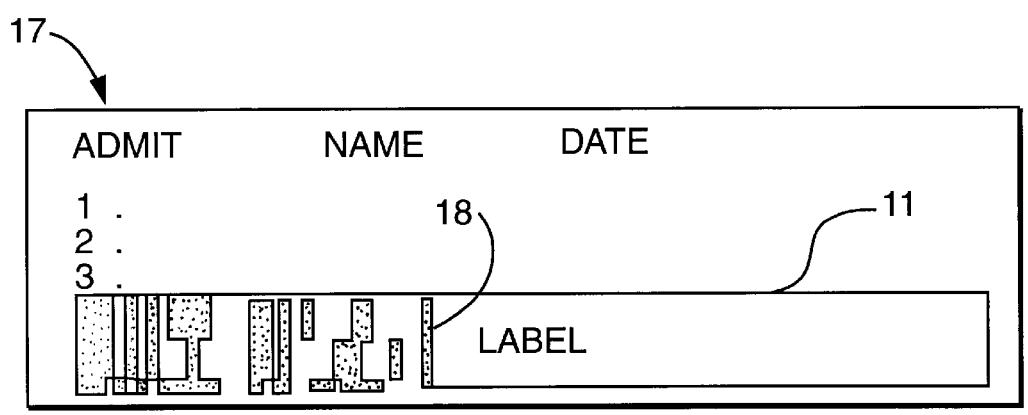
FIG. 1B is a diagram of an admission ticket having encoded words printed on a label which is easy to remove and apply in accordance with a second embodiment of the invention.

Instead of erasable ink, the encoded information can be altered by reprinting a removable label. FIG. 1B shows an admission ticket 17 containing a label 11 which bears a two-dimensional pattern 18 containing encoded information about privileges associated with the record or information about the holder of the record. For example, if ticket 17 were for a seminar containing several workshops, the information in label 11 could indicate which workshops that holder could attend. When the holder attended a workshop, the ticket would be read to verify that the workshop could be attended by the holder of the ticket. Then, a new label would be printed and attached to the ticket reflecting the fact that the workshop was attended. Such information could either be used for informational purposes or to prevent unauthorized attendance at the same workshop (or exhibition, etc.) multiple times.

Additionally, if ticket 17 were for an amusement park, the label 11 could contain encoded data indicating which rides were available on the ticket. The label would be read when admission to a ride occurred, and a new label for the ticket could be printed indicating that the holder could no longer go on that one ride without purchasing a new ticket.

Figure 1C:
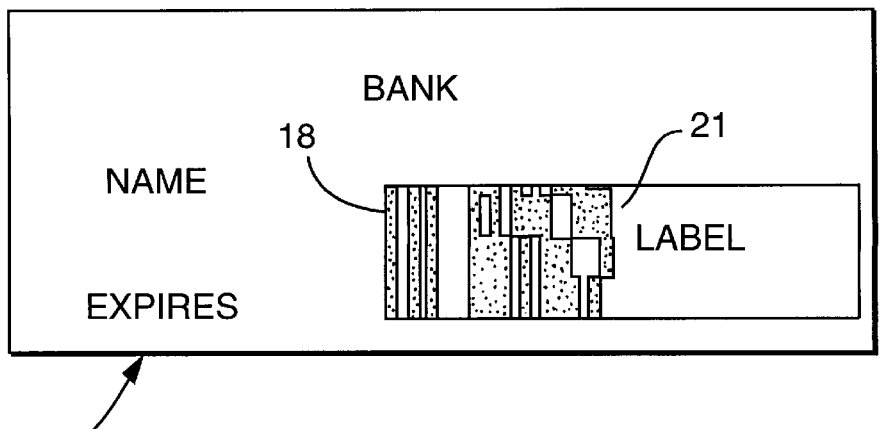
FIG. 1C is a diagram of a charge card with data words printed on a removable label in accordance with the second embodiment of the invention.

The above examples are exemplary only. For example, another use for a label with encoded information is with charge cards as shown in FIG. 1C. A label 21 could be placed on a charge card 19 indicating a credit limit. Each time the charge card was used, that label would be read in determining whether the purchase was within the limit. If so, the amount of the purchase would be deducted from the limit, and a new limit would be printed on the label indicating the reduced limit. When the bill was paid, the bank would send a new label 21 with a new spending limit.

Code PDF417

Before discussing the method and apparatus for encoding and decoding data in machine readable graphic form, such as the two-dimensional bar code PDF417, it is important to understand the structure of the two-dimensional bar code symbol itself.

Each PDF417 symbol is composed of a stack of rows of bar-coded information. Each row in the symbol consists of a start pattern, several symbol characters called "codewords," and a stop pattern. A codeword is the basic unit for encoding a value representing, or associated with, certain numbers, letters, or other symbols. Collectively, the codewords in each row form data columns.

Both the number of rows and the number of data columns of the PDF417 symbol are variable. The symbol must have at least three rows and may have up to ninety rows. Likewise, within each row, the number of codewords or data columns can vary from three to thirty.

Figure 2:
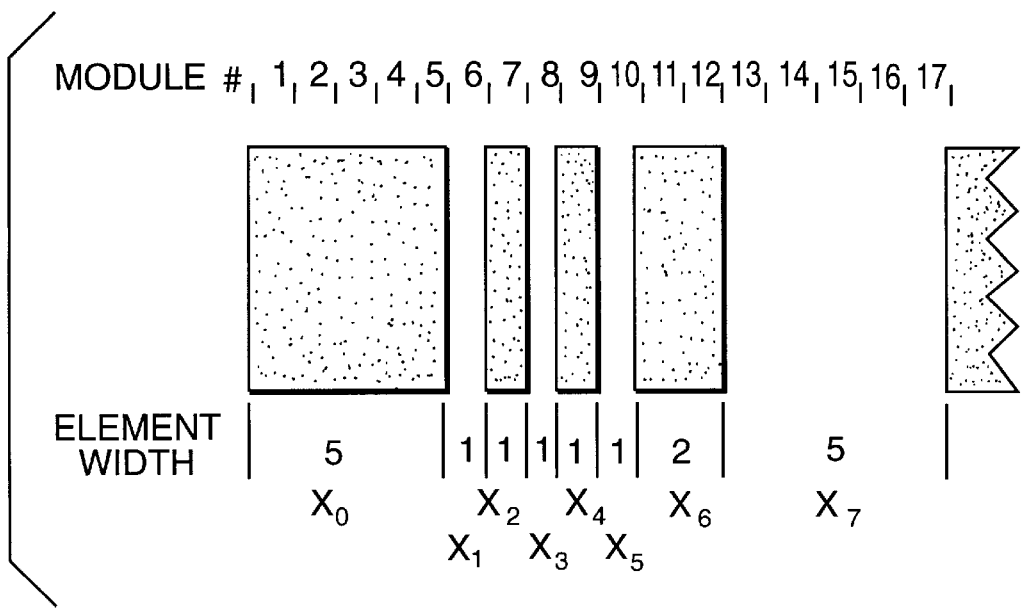
FIG. 2 is a diagram illustrating one example of a codeword in PDF417.

Each PDF417 codeword consists of seventeen modules or units. There are four bars and four spaces in each codeword. Individual bars or spaces can vary in width from one to six modules, but the combined total per codeword is always seventeen modules. Thus, each codeword can be defined by an eight-digit sequence, which represents the four sets of alternating bar and space widths within the codeword. This is called the "X-sequence" of the codeword and may be represented by the sequence $X_0, X_1, \ldots X_7$. For example, for an X-sequence of "51111125", the first element is five modules wide, followed by five elements one module wide, one element two modules wide, and the last element five modules wide. This example is illustrated in FIG. 2.

The set of possible codewords is further partitioned into three mutually exclusive subsets called "clusters." In the PDF417 symbol, each row uses only one of the three clusters to encode data, and each cluster repeats sequentially every third row. Because any two adjacent rows use different clusters, the decoder is able to discriminate between codewords from different rows within the same scan line.

The cluster number of a codeword may be determined from its X-sequence using the following formula:

$$\text{cluster number} = (X_0 - X_2 + X_4 - X_6) \bmod 9$$

where "mod 9" is the remainder after division by nine. Referring to the codeword in FIG. 2, the cluster number is calculated as follows:

$$\text{cluster number} = (5 - 1 + 1 - 2) \bmod 9 = 3$$

To minimize error probabilities, PDF417 uses only three clusters, even though nine are mathematically possible.

Thus, each row uses only one of the three clusters 0, 3, or 6, to encode data, with the same cluster repeating sequentially every third row. Row 0 codewords, for example, use cluster 0, row 1 uses cluster 3, and row 2 uses cluster 6, etc. In general, the cluster number may be determined from the row number as follows:

$$\text{cluster number} = ((\text{row number}) \mod 3) * 3$$

There are 929 codeword values defined in PDF417. These values are 0 through 928. Each cluster presents the 929 available values with distinct bar-space patterns so that one cluster cannot be confused with another.

Figure 3:
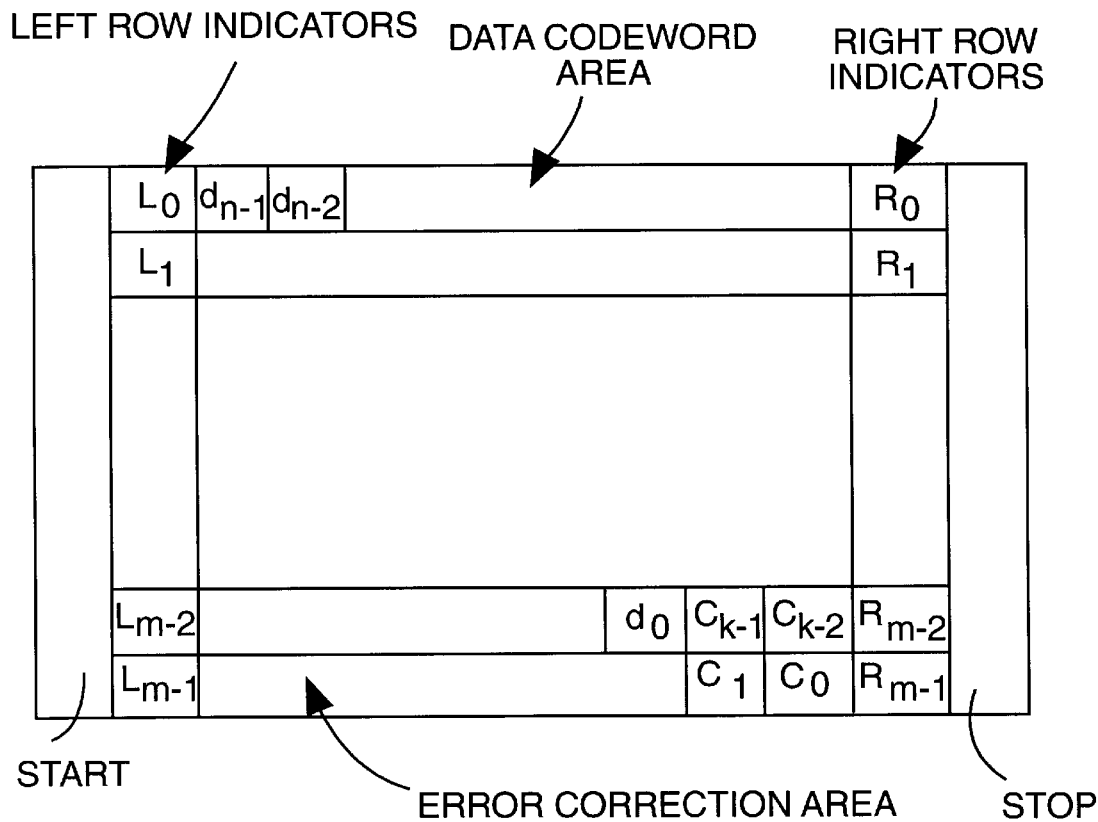
FIG. 3 is a diagram illustrating the overall structure of a PDF417 symbol.

FIG. 3 is a block diagram showing the overall structure of a PDF417 symbol. Each row of the symbol consists of a start pattern, a left row indicator codeword $L_i$, data codewords $d_i$ or error detection/correction codewords $C_i$, a right row indicator codeword $R_i$, and a stop pattern. The minimum number of codewords in a row is three, including the left row indicator codeword, at least one data codeword, and the right row indicator codeword. The right and left row indicator codewords, which are discussed further below, help synchronize the structure of the symbol.

The start and stop patterns identify where each row of the symbol begins and ends. PDF417 uses unique start and stop patterns. The start pattern, or left side of each row, has the unique pattern, or X-sequence, of "81111113". The stop pattern, or right side of each row, has the unique X-sequence of "711311121".

Every symbol contains one codeword (the first data codeword in row 0) indicating the total number of codewords within the symbol, and at least two error-detection codewords $C_0$ and $C_1$. These two error-detection codewords together form a checksum which is two codewords long.

Figure 5:
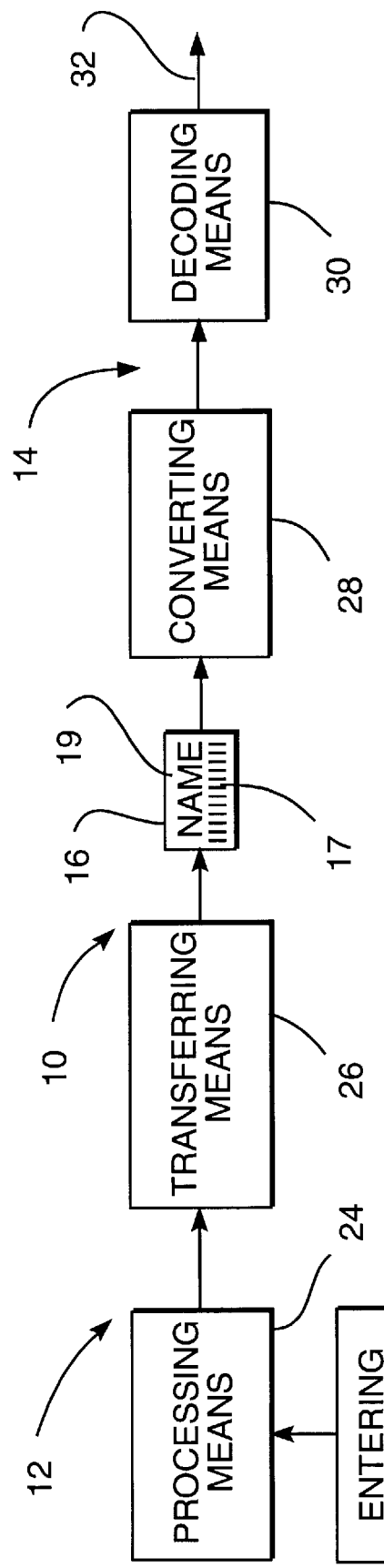
FIG. 5 is a block diagram of a system for printing and reading codes including an image.

A PDF417 symbol can also encode data with error correction capability. The level of error correction capability, called the "security level," is selected by the user and ranges from 0 to 8. This means, for example, that at level 6, a total of 126 codewords can be either missing or destroyed and the entire symbol can be read and decoded. FIG. 5 is a table showing the relationship between the security level of the PDF417 symbol and the number of error correction codewords $C_i$.

In addition to correcting for missing or destroyed data (known as "erasures"), PDF417 can also recover from misdecodes of codewords. Since it requires two codewords to recover from a misdecode, one to detect the error and one to correct it, a given security level can support half the number of misdecodes that it can of undecoded codewords.

This error correction feature is particularly useful when information in PDF417 format overlays partially erased coded words. This partial erasure creates the possibility that the unerased code portions will distort portions of the encoded information. If that happens, errors can be corrected with the PDF417 two-dimensional bar code.

The row indicator codewords in a PDF417 symbol contain several key components: row number, number of rows, number of data columns, and security level. Not every row indicator contains every component, however. The information is spread over several rows, and the pattern repeats itself every three rows. The pattern for encoding the information in the row indicator codewords can be illustrated as follows:

Row 0: $L_0$ (row #, # of rows) $R_0$ (row #, # of columns)
Row 1: $L_1$ (row #, security level) $R_1$ (row #, # of rows)
Row 2: $L_2$ (row #, # of columns) $R_2$ (row #, security level)
Row 3: $L_3$ (row #, # of rows) $R_3$ (row #, # of columns) etc.

In other words, the left row indicator codeword $L_0$ for the first row 0 contains the row number (0) and the total number of rows in the symbol. The right row indicator codeword $R_0$ for row 0 contains the row number (0) and the number of data columns in the symbol, and so on.

Encoding data into a PDF417 symbol is typically a two-step process. First, data is converted into codeword values of 0 to 928, which represent the data. This is known as "high-level encoding." The values are then physically represented by particular bar-space patterns, which is known as "low-level encoding."

Encoding/Decoding System

Encoders and decoders are discussed more completely in the referenced application U.S. Ser. No. 07/851,505.

Figure 6:
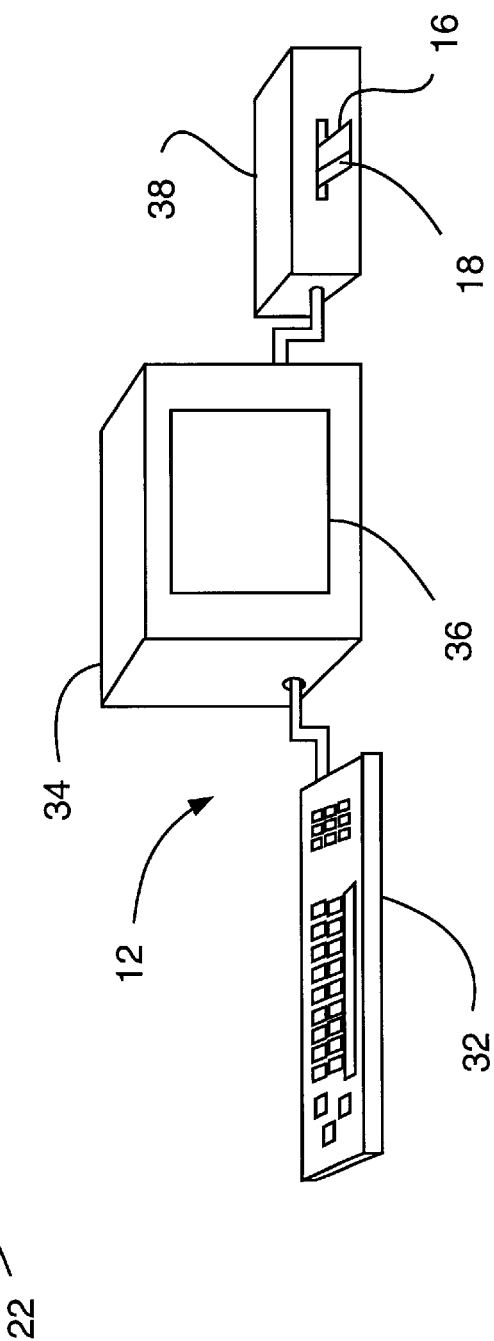
FIG. 6 is a perspective view of an encoding means of the system in FIG. 5 and 5A.
Figure 7:
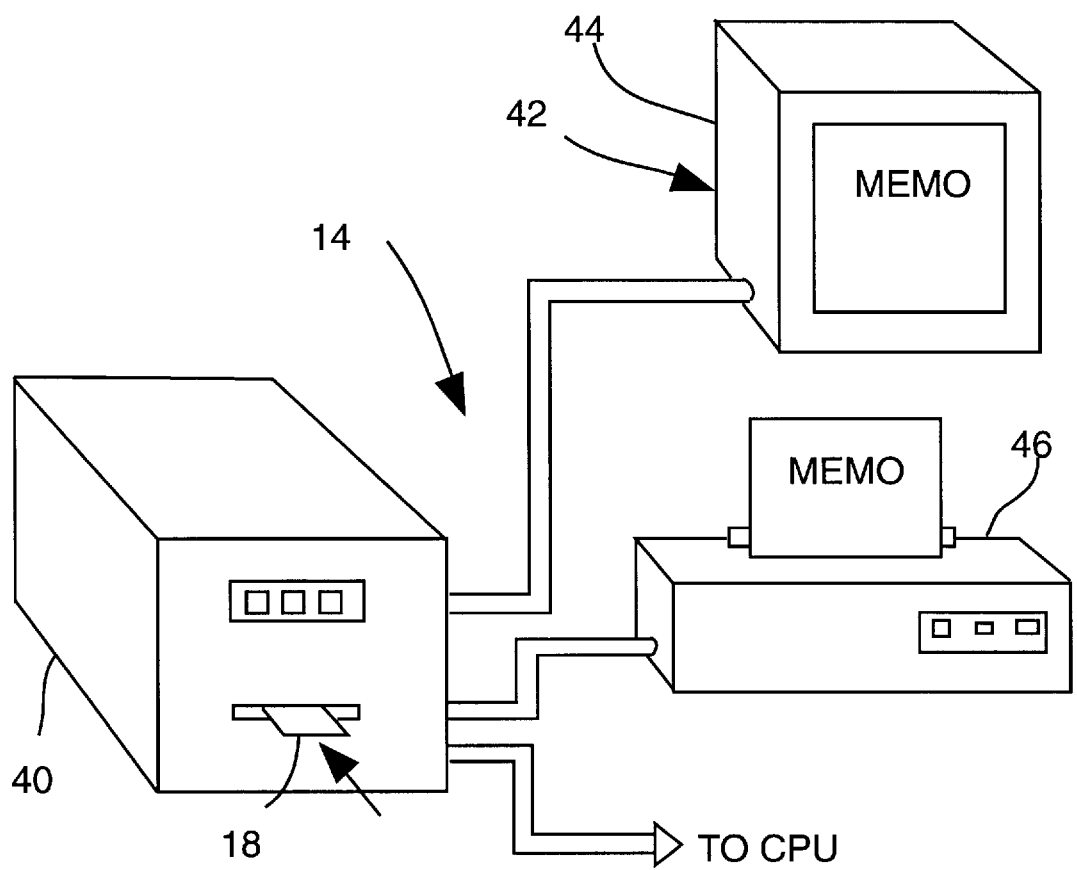
FIG. 7 is a perspective view of a recognition means of the system in FIG. 5.

Referring now to FIGS. 5–7 in the drawings, FIG. 5 is a block diagram of the system 10 for representing and recognizing data on a record in machine readable graphic image form. System 10 includes an encoding means, generally indicated by the reference numeral 12, and a recognition means, generally indicated by the reference numeral 14. Encoding means 12 produces a record 16 (see FIG. 1A), such as a health card, an admission ticket 17 (see FIG. 1B), or a charge card 19 (see FIG. 1C); each of which includes text and/or a photograph associated with the text of each record would be data encoded in a two-dimensional pattern. The two-dimensional pattern is recognized by recognition means 14 to produce output signals representative of the data encoded into the respective pattern.

Data to be encoded into the two-dimensional pattern on record 16, 17, or 19 is entered into the encoding means 12 by entering means 22. The data entered by entering means 22 includes data to be encoded into the two-dimensional pattern 18. Processing means 24 encodes the set of data into a two-dimensional pattern and generates transfer drive signals for controlling the transfer of indicia onto record 16, 17, or 19 as the case may be. Although the record 16 may be referred to herein from time to time for simplicity of explanation, it is to be understood that record 17, 19, or any other type record could be subjected to the described processing. Transferring means 26 detects the presence of machine readable data and in response to a first drive signal erases the detected data from the record or label by wiping an erasing fluid over the area of the record containing the detected representations. Transfer means 26 then actuates a blower for a predetermined period of time to dry the applied erasing fluid. The transfer means includes a printer 38, which transfers a conventional erasable ink that responds quickly to the erasing fluid and has a quick drying time. If desired, human readable date also may be transferred onto the record. Processing means 24 generates another set of transfer signals for transferring the human readable data onto the record. A portion of all the data to be encoded and the human readable data may be transferred from a storage memory in processing means 24 or other computer files rather than being entered by means 22.

Recognition means 14 includes converting means 28 that converts the image on record 16, 17, or 19 into electrical signals representative of the indicia. Decoding means 30 decodes the electrical signals into decoder output signals, indicated at 32, that are representative of the data encoded into the two-dimensional pattern.

FIG. 6 is a perspective view of one embodiment of encoding means 12. The embodiment of FIG. 6 is for illustrative purposes, and is not meant to limit the scope of the invention. In this embodiment, the entering means 22 of FIG. 5 is shown in form of a keyboard 32 for entering alphanumeric and graphic data into the encoding means 12.

Entering means 22 may take forms other than a keyboard, such as an optical scanning means for scanning data directly from documents for entry into the encoding means 12.

Referring again to FIG. 6, the processing means 24 of FIG. 5 is shown in the form of a processor and display unit 34. The data entered by keyboard 32 is transmitted to the processor and display unit 34 for storage and processing. In addition to entering data, the keyboard 32 is also used for entering control commands to effect operation of the processor unit 34.

The data entered by keyboard 32 is preferably displayed on display screen 36, and upon entry of a proper control command, is also stored in memory. The data to be encoded into the pattern 18 is stored in a first memory in processor 34, and the data, if any, to be transferred in human readable form is stored in a second memory. Alternatively, both data may be stored in a separate portion of a single memory. Upon the appropriate control command from keyboard 32, the processor unit 34 encodes the data in the first memory into a two-dimensional pattern, such as 11, 18, or 21 for example, and generates first transfer drive signals representative of the data stored in the first memory. The processor unit 34 also generates second transfer drive signals representative of the data stored in the second memory.

The processor unit 34 is shown in FIG. 6 as being coupled to a printer 38, which printer is one form of the transferring means 26 of FIG. 5. In response to the first transfer drive signals, printer 38 detects the presence or absence of machine readable data on a record inserted therein. If no machine readable data is detected, the first transfer drive signals causes printer 38 to transfer in erasable ink an image of the two-dimensional pattern onto a record or to a removable label disposed in the encoded area of the record and may print a second set of data in human readable form onto the record in response to the second transfer drive signals. For the embodiment in FIG. 1A, for example, if machine-readable data is detected, an erasing solution is applied to the record inserted in the printer to erase the detected data from the record. Once the detected data is erased, a blower is activated to dry the appropriate record area in preparation for the printing of the new-encoded data, and then the two-dimensional patterns is printed in the erased portion in erasable ink in preparation for the text update of the encoded data.

Turning now to FIG. 7, the recognition means 14 includes a card reader 40 which contains the converting means 28 and the decoding means 30 of FIG. 5. The use of appropriate converting means that corresponds to the particular data encoding technology employed is contemplated by the present invention.

The converting means 28 may be a bar code reader such as those disclosed in U.S. patent application Ser. Nos. 317,433 and 317,533, and incorporated herein by reference, which can read the ink used by printer 38. The readers disclosed in the above patent applications are open system devices designed to read an optically encoded two-dimensional bar code and to convert the light reflected from the pattern into electrical signals representative of the graphic indicia.

Figure 7A:
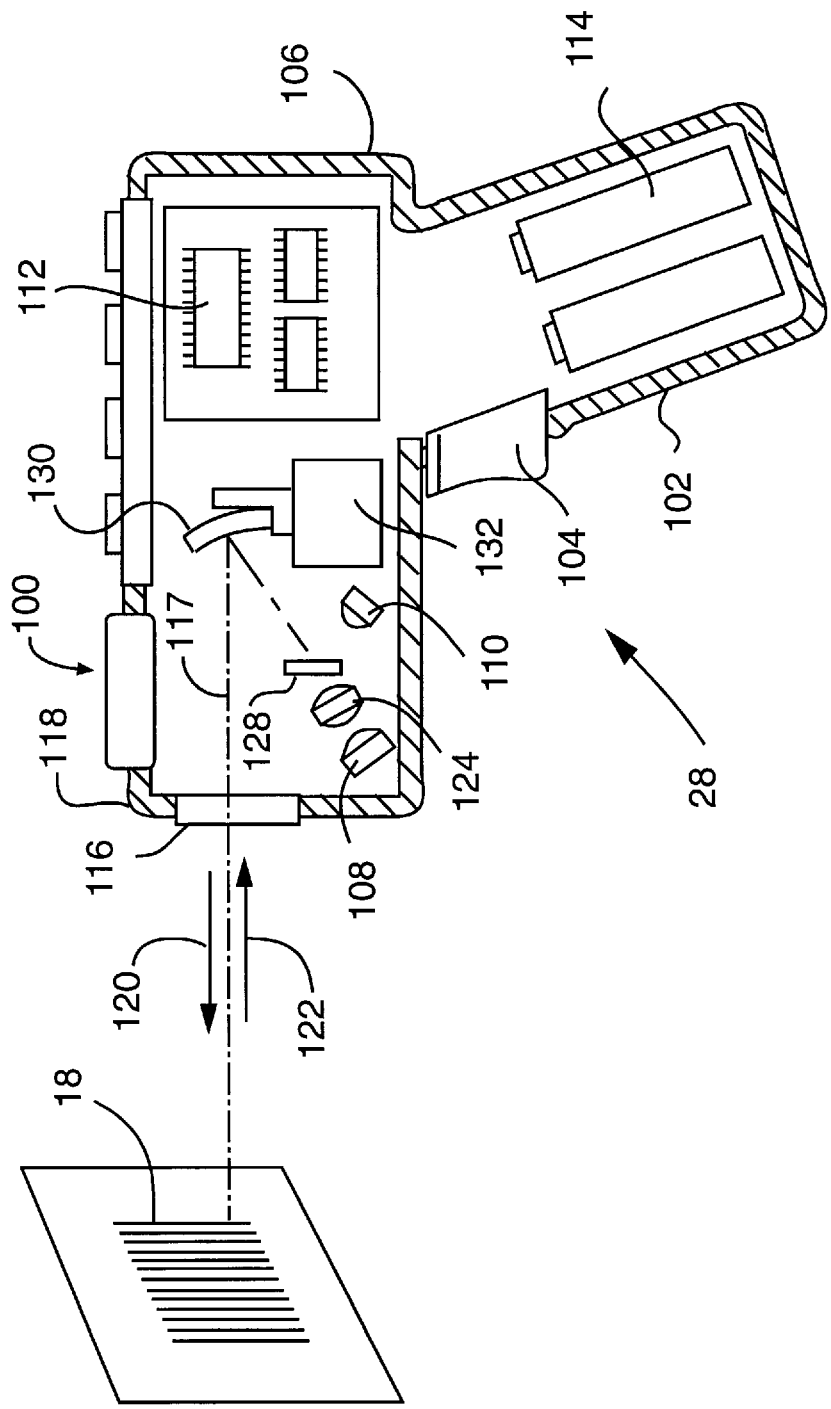
FIG. 7A illustrates a bar code reader implemented as a gun shaped device for reading the records of the present invention.

Referring to FIG. 7A, a typical exemplary embodiment of a bar code reader of converting means 28 is implemented as a gun shaped device 100, having a pistol grip type of handle 102. A movable manually actuated trigger switch 104 is employed to allow the user to activate the light beam 117 and detector circuitry, typically after the time when the user has positioned the device to point at the symbol to be read.

A light-weight plastic housing 106 contains a laser light source 108, the detector 110, the optics and signal processing circuitry and the CPU 112, as well as a power source or battery 114. A light-transmissive window 116 in the front end of the housing 118 allows the outgoing light beam 120 to exit and the incoming reflected light 122 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of perhaps several inches or even further.

The reader 100 may also function as a portable computer terminal, and in such embodiments include a keyboard and a display, such as described in the previously noted U.S. Pat. No. 4,409,470.

As further depicted in FIG. 7A, a suitable lens 124 (or multiple lens system) may be used to focus the scanned beam into a scanning spot at an appropriate reference plane. Light source 108 such as a semiconductor laser diode is positioned to introduce a light beam into the axis of the lens 124, and the beam passes through a partially-silvered mirror 128 and other lenses or beam-shaping structure as needed. The beam is reflected from an oscillating mirror 130 which is coupled to a scanning motor 132 which is energized when the trigger 104 is pulled. If the light produced by the source 108 is marginally visible, an aiming light may be included in the optical system. The aiming light if needed, produces a visible-light spot which may be fixed, or scanned just like the laser beam; the user employs this visible light to aim the reader unit at the symbol before pulling the trigger.

Returning to FIG. 5, the decoding means 30 decodes the electrical signals into output signals representative of the data encoded onto record 16. The decoder output signals are outputted from the recognition unit 40 to various output means 42. FIG. 7 depicts two examples of output devices, one being a display unit 44 and the other a printer 46. Display unit 44 may be any suitable display such as liquid crystal display or a CRT. The printer 46 may be any print device such as a dot matrix printer, laser printer, etc.

The system maximizes the use of available space for encrypting data. The density of the encoded data is such that for a two-dimensional bar code symbol, a minimum of about 1600 characters can be encoded into a space of approximately 5"×½. In addition to being compact, the system provides for high security in the transmission of information.

Although the encoding means 12 and the recognition means 14 are shown in FIGS. 5 through 7A as separate devices, they can be in the same device. This is particularly useful when a record is read and modified. In such cases it would be useful to have a single unit for both purposes.

Figures 4, 5A:
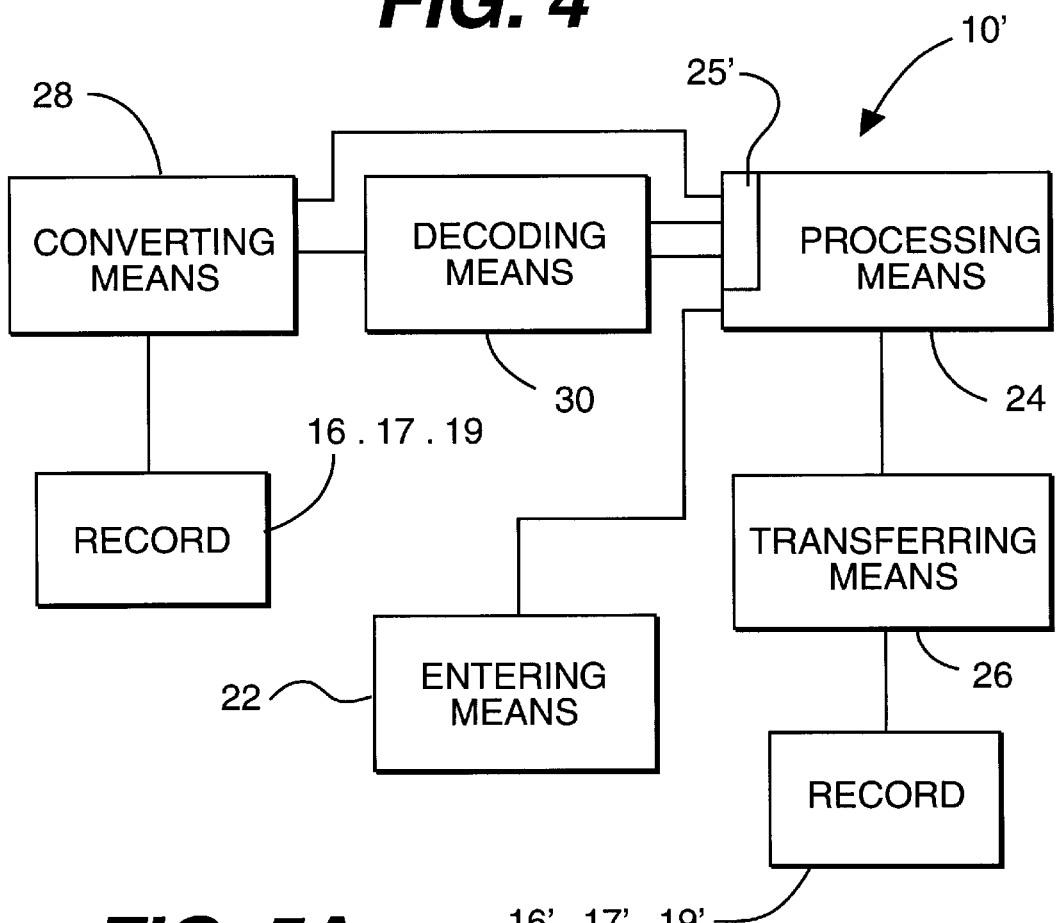
FIG. 4 is a table listing the number of error correction codewords for a given security level in PDF417.
FIG. 5A is a block diagram of a system for reading, modifying and reprinting a record or a label.

FIG. 5A shows a block diagram of a system 10' for use with a record such as 16, 17, or 19, for example. System 10' includes elements that correspond to those of system 10 shown in FIGS. 5–7. Specifically, system 10' includes a converting means 28 which converts the encoded data from a record, such as 16, 17, or 19 into electrical signals, and a decoding means 30 which decodes those signals. Processing means 24 then reads the decoded signals and, based upon certain criteria, cause transferring means 26 to print appropriate output signals to modify record 16, 17, 19 into a record 16', 17', 19'.

The new information could be determined in a variety of ways. For example, if the record is a charge card 19, processing means 24 could be a large computer or a computer network which keeps track of credit limits.

Processing means 24 also preferably includes alignment means 25 for locating selected areas of record 16, 17, 19 for reading a printing. Alignment means 25 interprets fields that identify rows and particular words in those rows. Although alignment means 25 is shown as part of processing means 24, it could also be a microprocessor in either converting means 28 or transferring means 26.

Figure 8:
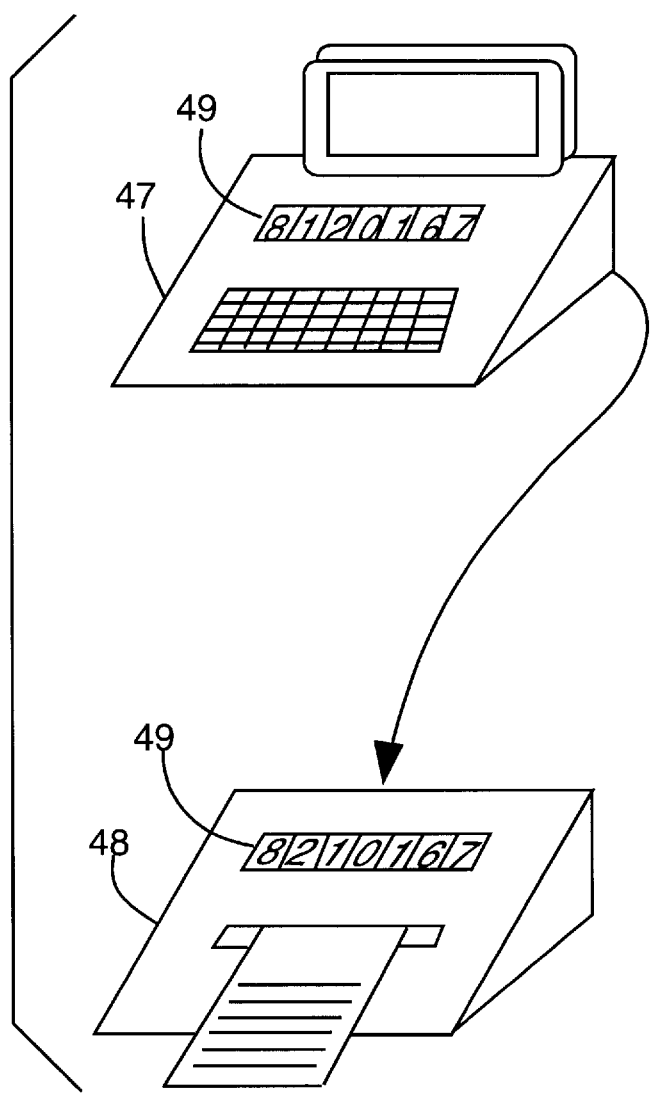
FIG. 8 is a perspective view of a data entry device and reader in which a key may be entered for encrypting and decrypting data.

Data may also be encoded using a keyed encryption algorithm that may be accessed only by an encryption key. As shown in FIG. 8, the data entry means 47 contains the keyed algorithm and upon entry of the key 49, the data will be encoded into a two-dimensional graphic pattern in a unique configuration. The unique configuration can only be read by a reader 48 having the proper algorithm, and only upon entry of the key 49 into the reader. Thus, a high degree of security may be provided with the keyed encryption embodiment.

Another feature of the present invention is to have the image on record be a "digital signature" which is embedded as the PDF417 bar code in encrypted form. The printer which created the two-dimensional digital signal would then use a keyed encryption algorithm that could be accessed only by an encryption key. By use of a keyboard or other data entry means which had the keyed algorithm, and upon entry of the key, the data entered as plain text on a keyboard would be encoded into the two-dimensional graphic pattern in a unique decoded configuration. The unique pattern or code configuration could only be decoded and read by a reader having the algorithm and only upon entry of the identical key into the reader. This provides a high degree of security for applications needing such security.

A record 16, 17, 19 is fed into converting means 28 where the encoded data is read, and decoded at 30; and preferably displayed. New encoded data is entered at 22 which modifies or completely changes data read and decoded at 28 and 30 respectively. The new encoded data may then be processed at 24; and transferred by the transferring means 26 which includes a printer, such as 38', which may paint the code directly on the record or a label removably affixed to the record.

FIG. 5B illustrates a printer 38', which is conventional RAM (random access memory) printer 38' that is modified as illustrated. Printer 38 includes a base portion 314 having a surface 316 for supporting record 16, which is fed to the printer from a paper guide 320.

At the entrance to the printer is a roller 322 which has an absorbent surface 324 which applies erasing fluid from container 326 onto record 16. Roller 322 is rotatably attached to container 326 which in turn is pivotably attached to base 314. A spring 328 pivotably biases container 326 clockwise into engagement with solenoid 330 and roller 324 spaced from record 16. Upon detection of machine readable data in record 16 by a sensor 332, solenoid 330 is energized which pivots the container and roller 322 into erasing position while the record is being fed. A fan 334 is activated to quickly dry the erased area of the record as document 16 continues to be fed to a printing roller 336 which is rotatably attached to base 314 to apply erasable ink from supply 37 to the record 16 in the form of machine readable data.

There are many known erasable inks, such as those referred to in U.S. Pat. No. 4,097,290, for example. Such erasable inks may be erased in a well known manner by well known chemicals including a bleaching solution. Although, the application of an erasing solution is specifically shown and described; an elastomer member that is in the form of a geometric figure having a planar erasing surface may be placed in engagement with the code of the record and vibrated relative the record to mechanically and frictionally erase the code. Also, for some applications, the code may be placed on a removable gummed label, whereby the entire label is removed and replaced with another blank label before placing it in a printer, or a removable gummed label may be printed with erasable ink.

Figure 5C:
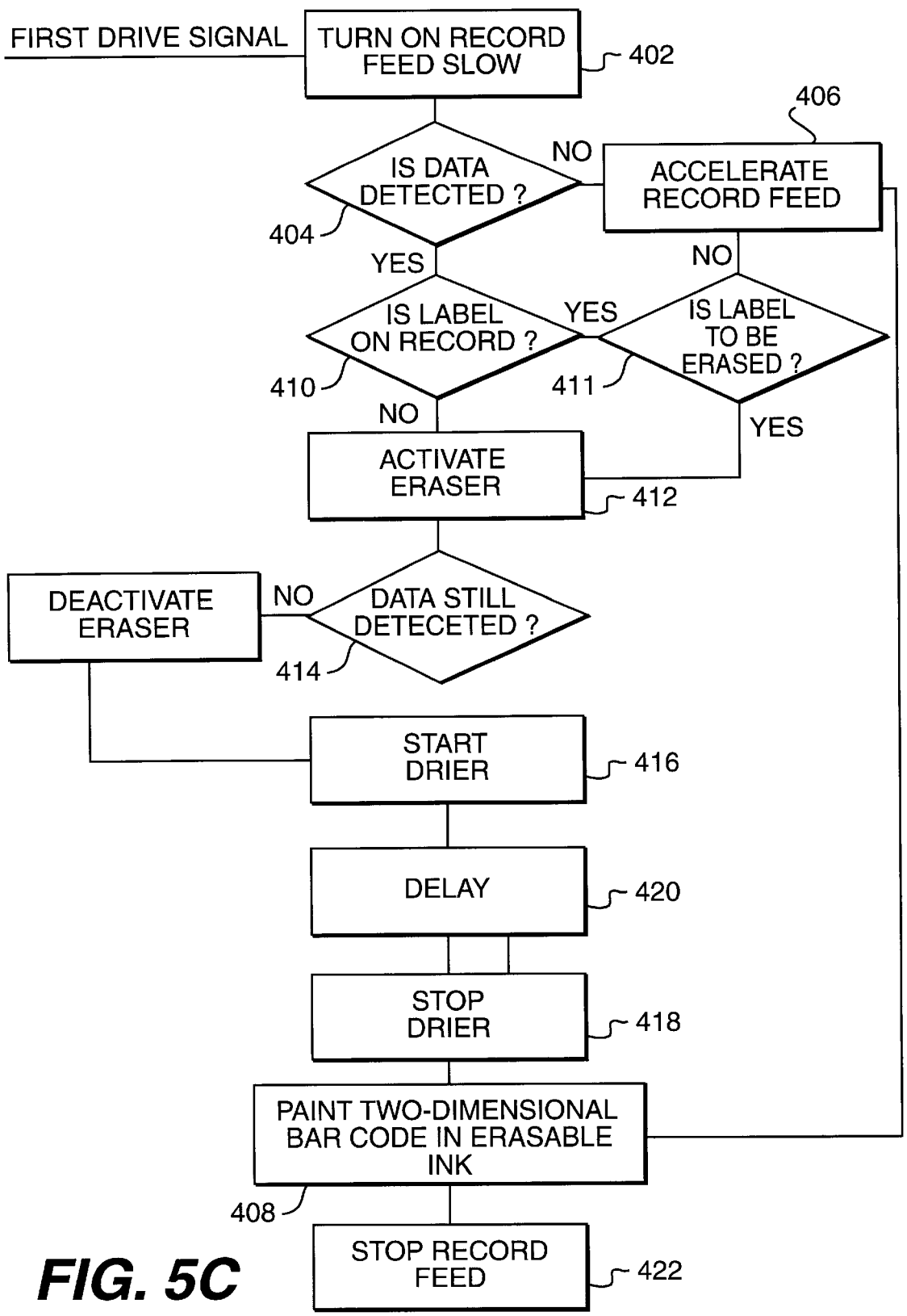
FIG. 5C is a flow chart showing operation of the printer of FIG. 5B.

FIG. 5C is a flow chart illustrating the sequence of events in printing new encoded information on a record or label in erasable ink. In response to a first drive signal, the record feed is turned on as indicated at step 402 to move the record at a slow rate into the printer from a slot or paper guide, as the case may be. The printer then detects whether or not encoded data is on the record at decision step 404. If no data is detected, the motor conveying the record is accelerated at step 406 to position the record quickly for printing of the bar code at step 408. If data is detected, and it is determined at decision block 410 that the data is on a label; and at decision block 411 it is determined whether the label is to be erased. If the detected data is printed on a removable label as determined at decision step 410 and the data is not to be erased, the record feed may be accelerated at step 406 and printed as indicated by step 408. However, if it is determined at decision step 410 that the data is printed on the record directly, erasing roller 324 is activated by energizing solenoid 330 to apply erasing fluid to the painted data at step 412.

When the data ceases to be detected at step 414 indicating that erasure is completed, blower 334 is activated to accelerate the drying of the record at step 416. After starting the blower at step 416, it is shut off at step 418 after a delay of a few seconds, as shown at step 420. Then, a two-dimensional bar code is printed on the erased portion of the record at step 408. The record feed is stopped at step 422 after printing; and the record with the new encoded data can be removed from the printer.

Returning to FIG. 1, a low-level decoder may be embodied in a computer program operating on a microcomputer separate from the host computer. The low-level decoder would be preferably connected to the host computer by a standard interface, such as an RS-232 interface, for transmitting the codeword values after they are decoded. Alternatively, the low-level decoder could be embodied entirely in hardware, or a combination of a hardware and software, which is physically located in either the scanner itself or the host computer.

The matrix of codeword values from low-level decoder is decoded into usable data by a high-level decoder, which may be embodied as a separate computer program operating on the host computer. For example, PDF417 has three predefined modes and nine reserved modes. The predefined modes are Binary, EXC, and Numeric. In the Binary mode, each codeword can encode 1.2 bytes. In the EXC mode, the alphanumeric data can be encoded in double density (i.e., two characters per code word), and in Numeric mode, the numeric data can be packed in almost triple density. Therefore, the high-level decoder in host computer 112 will further decode the codeword values (0–928) from low-level decoder 114, depending on the mode, to obtain the actual data embodied in the symbol. The decoded data from the high-level decoder may then be used by a user application program also operating on the host computer 112.

Figure 9:
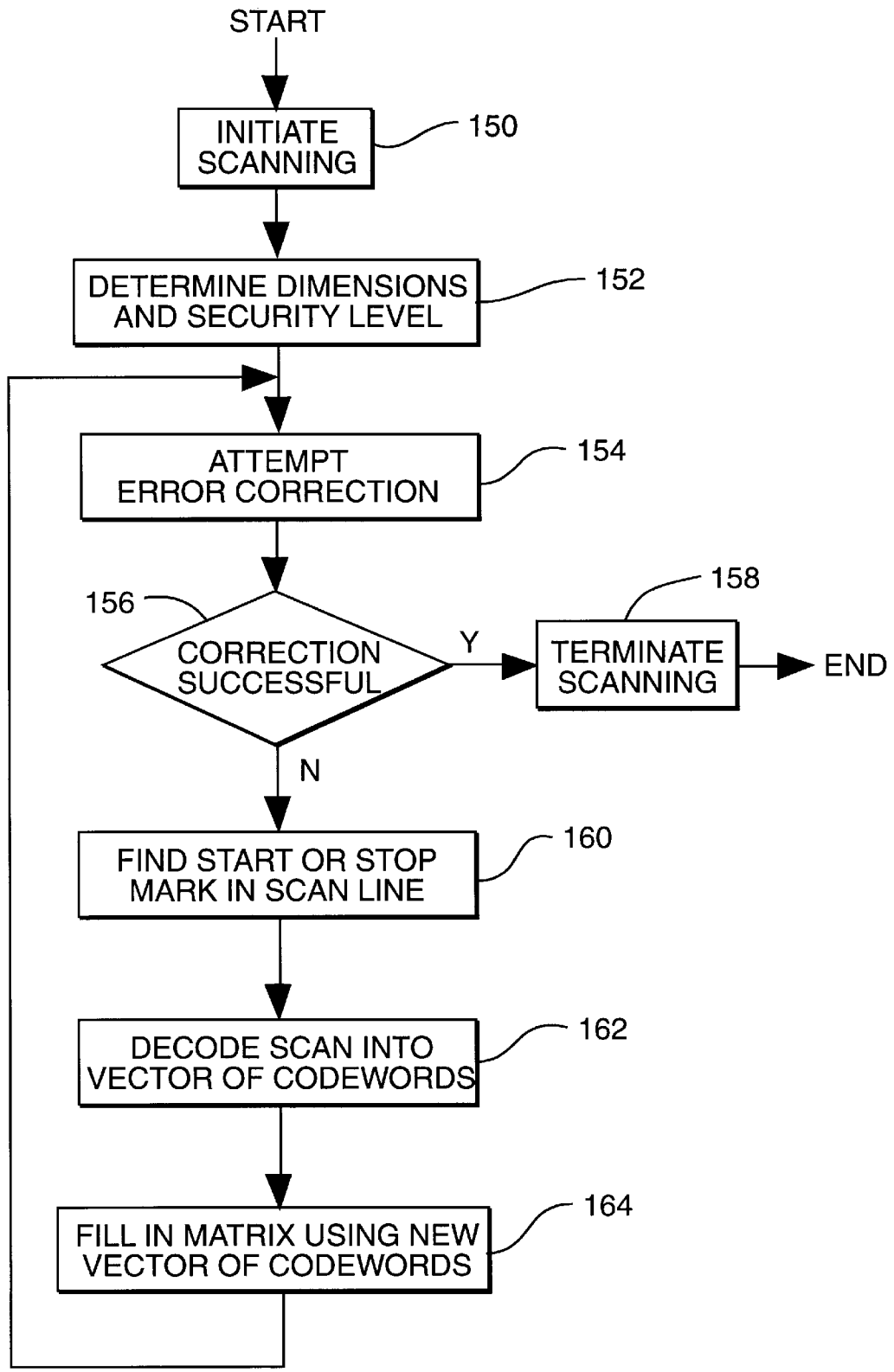
FIG. 9 is a flow diagram of the steps performed by the low-level decoder for decoding a two-dimensional bar code symbol.

FIG. 9 is a flow chart showing the sequence of operation of a low-level decoder for decoding a two-dimensional bar code symbol such as PDF417 into a matrix of codeword values. The various steps in the sequence are embodied in a software computer program which is stored and executed by processor 34.

In the first step 150 in FIG. 9, the low-level decoder initializes the scanner interface and initiates scanning of the symbol. The actual functions performed in this step will depend on the type of scanner and will involve various scanner-dependent routines to initialize the scanner interface and to start scanning.

In step 152, the low-level decoder attempts to determine the dimensions and the security level of the symbol being scanned. Specifically, this step determines the number of rows, the number of data columns, and the security level of the symbol from the left and right row indicator codewords. These dimensions are then used to initialize a two-dimensional codeword matrix and other related parameters for decoding the symbol. Each location in the matrix contains both a codeword value and an associated confidence weight, which are initially set to a null or empty value. If the dimensions and security level of the symbol cannot be determined, then the scan is aborted. This step will be discussed in further detail below in connection with FIG. 10.

Continuing in FIG. 9, step 154 is the first step in a control loop in which the rows of the two-dimensional bar code symbol are repeatedly scanned and the codeword values are filled into the codeword matrix. The steps of the control loop are each repeated until the number of codewords remaining in the matrix which have not been successfully decoded is small enough that the rest of the matrix can be determined using the built-in error correction capability of the symbol. Thus, in step 154, if the number of codewords which have not been successfully decoded is less than the error correction capability of the symbol based on the security level (see FIG. 4), an attempt is made to correct the matrix using the error-correction codewords. If the attempted error correction is successful, then in step 156, the control loop is exited and scanning is terminated in step 158. Otherwise, if the attempted error correction is not successful, then the following steps 160–164 are performed to try to decode additional codewords to fill in the matrix.

First, step 160 searches a scan line of data obtained from the buffer area of the memory for a start or a stop pattern. If either a start or a stop pattern is found, then in step 162, the low-level decoder attempts to decode as many codewords as possible from the scan line. Specifically, the scan line of data is parsed into individual codewords whose values and cluster numbers are placed in a codeword vector ready for incorporation into the codeword matrix. Both steps 160 and 162 are discussed in further detail below in connection with FIGS. 11 and 13, respectively.

The codeword vector produced in step 162 is analyzed and then used to update the codeword matrix in step 164. In particular, step 164 assigns a confidence weight to each codeword value depending on whether its nearest neighbors were also decoded. Row numbers are also assigned to each codeword value based on the left or right row indicator codewords and the corresponding cluster number for the codeword. If the scan line crosses a row boundary, the cluster numbers of the codewords can be used to determine the correct row number for each individual codeword. For example, if a decoded scan line has a left row indicator with row number 2, and the cluster numbers of the following codewords are 6, 0, 0, 3, the codewords are accordingly placed in the following locations: (row 2, column 1); (row 3, column 2); (row 3, column 3); and (row 4, column 4). In this way, a single scan line of data can contain codewords from more than one row, which can then be stitched into the appropriate location in the codeword matrix. This step is discussed in further detail in connection with FIGS. 16A and 16B below.

Figure 10:
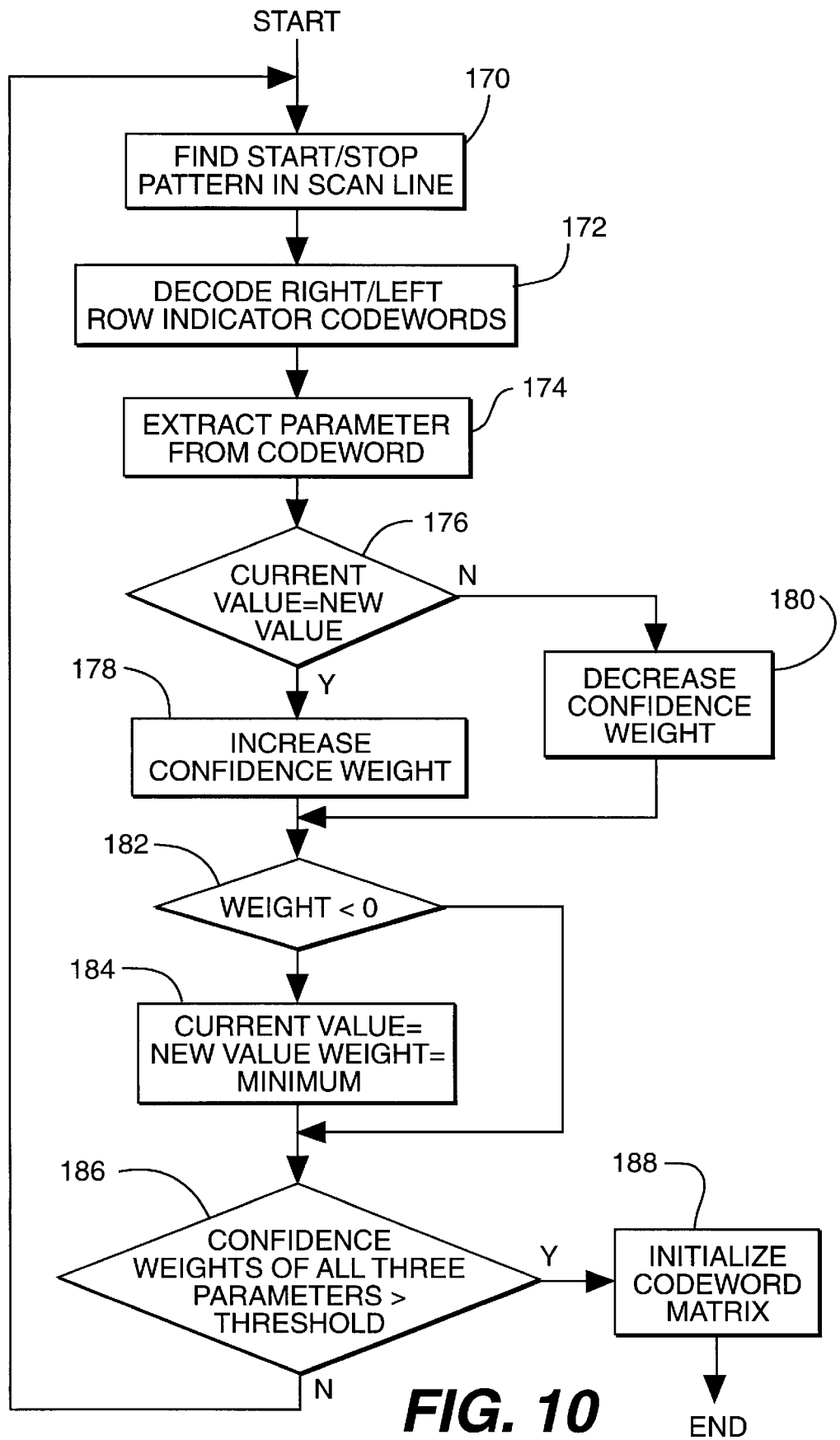
FIG. 10 is a flow diagram of the steps performed by the low-level decoder for determining the dimensions and security level of the symbol being scanned.

FIG. 10 is a flow chart showing in greater detail the sequence of steps for determining the dimensions and security level of a symbol as referred to in step 152 of FIG. 9 above. In the first step 170 of FIG. 10, the low-level decoder searches a scan line of data obtained from the buffer area of the memory for a start or a stop pattern. This step is the same as step 160 in FIG. 9 and is discussed in further detail in connection with FIG. 11 below.

Step 172 then decodes the first codeword immediately adjacent to either the start or stop pattern found in the previous step. As shown in FIG. 3, this codeword will be either a left or right row indicator codeword containing the row number and either the number of rows, the number of data columns, or the security level of the symbol. If both a start and a stop pattern are found, then both the left and the right row indicators are decoded. The sequence of steps for decoding an individual codeword are discussed further below in connection with FIG. 15.

Continuing in FIG. 10, in step 174 the particular dimension or security level encoded in the row indicator is extracted from the codeword value and the cluster number determined in the previous step 172. For example, for a left row indicator codeword with a cluster number of 0, the number of rows is extracted from the codeword value.

A confidence weight assigned to each of the dimensions and the security level is initially set to 0. Steps 176–184 update both the current value and the confidence weight of the dimension or security level extracted in the previous step in the following way. First, the particular parameter, say the number of rows, is compared to the current value of the number of rows obtained from previous decodes. If the current value of the number of rows and the newly decoded value are the same, as determined in step 176, then the confidence weight assigned to the number of rows is increased in step 178. If the current value and the newly-decoded value are different, however, then the confidence weight is decreased in step 180. If the confidence weight assigned to the particular parameter is decreased below zero as determined in step 182, then the newly decoded value is substituted for the current value and a new minimum weight is assigned to the parameter in step 184.

Step 186 determines whether the confidence weight for all three parameters, i.e., number of rows, number of data columns, and security level, exceeds a predetermined threshold. If so, then the two-dimensional codeword matrix is initialized in step 188 based on the current values of the number of rows and the number of columns. The number of correctable errors may also be determined from the current value of the security level according to the table in FIG. 4. If all three confidence weights do not exceed the threshold in step 186, however, then program control returns to step 170 to begin searching for the start and stop patterns in a new scan line. Steps 170–184 are repeated until all three parameters have been successfully decoded with a high degree of confidence.

Figure 11:
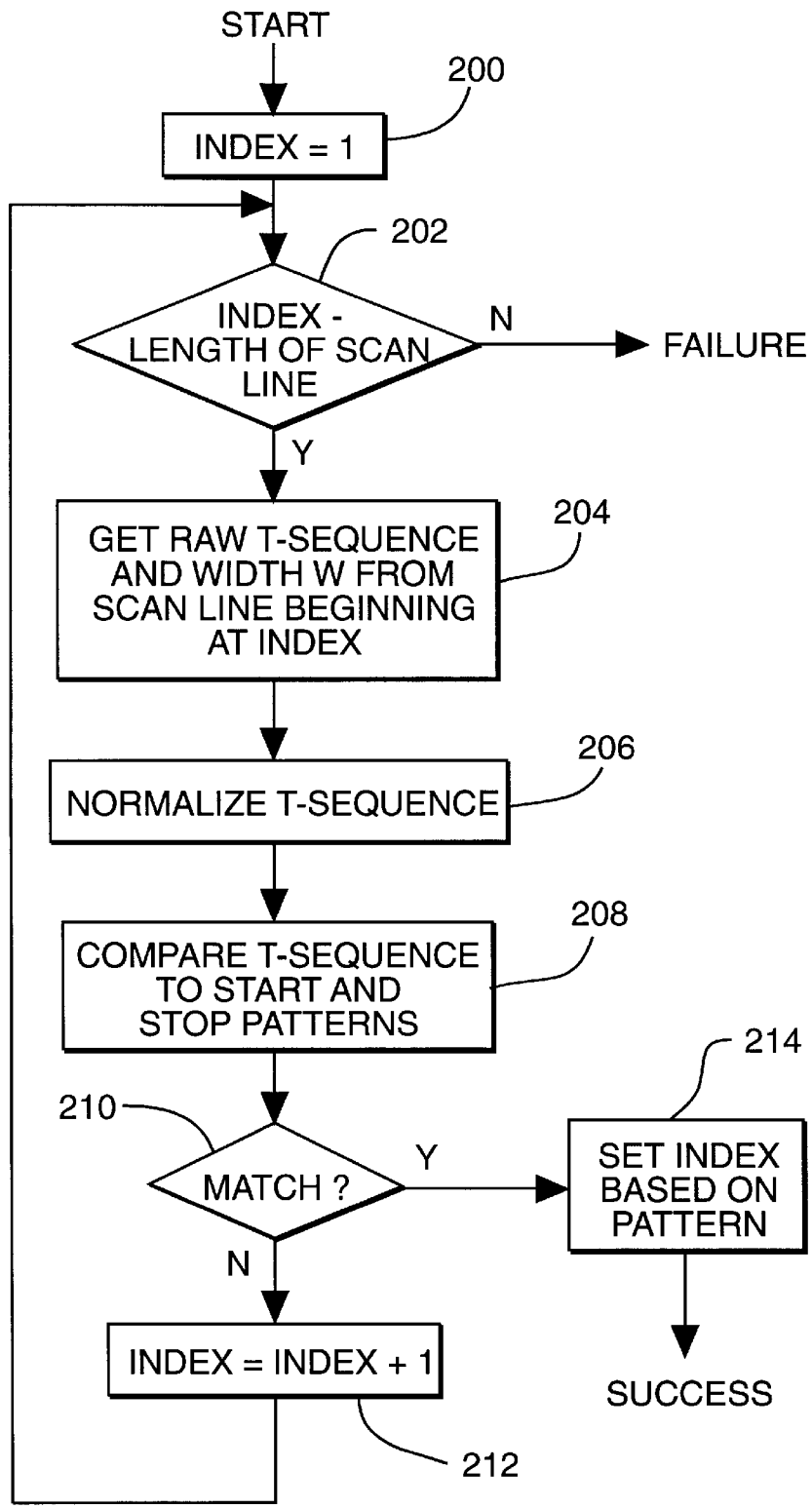
FIG. 11 is a flow diagram of the steps performed by the low-level decoder for searching a scan line of data for a start or a stop pattern.

FIG. 11 is a flow chart showing in greater detail the sequence of steps for searching a scan line of data for a start or stop pattern as referred to above in step 160 of FIG. 9 and step 170 of FIG. 10. Briefly, the search begins at the first location of an individual scan line of data obtained from the buffer area of the memory and is repeated at sequential locations until either a match is found or the length of the scan line is exceeded. When a match is found, an index is set to a location immediately following or preceding the pattern for decoding the adjacent code word.

As shown in FIG. 11, the first step 200 sets an index to the location of the data elements in the scan line to "1,"

indicating the first data element or integer value of the scan line. This index is used to identify the first element of each sequence of eight elements in the scan line for comparison to the start and stop patterns.

Step 202 is the first step of an iterative loop for searching the scan line from left to right for either a start or a stop pattern. In this step, if the current index is less than the length of the scan line, then the remaining steps are executed and the search continues. Once the index exceeds the length of the scan line, however, then the loop is exited and an indication is returned signifying that the search failed and a start or stop pattern was not found.

Rather than using the X-sequence of codeword, the low-level decoder decodes a symbol by using "edge to similar edge" measurements to compensate for ink spreading which occurs when printing the symbols. Thus, in step 204, a raw "t-sequence" is obtained from the scan line by adding pairs of consecutive integer values beginning at the location specified by the index. Specifically, the raw t-sequence, which corresponds to the seven width measurements $t_1, t_2, \ldots t_7$ shown in FIG. 12, is calculated by adding pairs of the consecutive integer values $x_0, x_1, \ldots X_7$, representing the widths of the bars and spaces, as follows:

$t_1 = x_0 + x_1$
$t_2 = x_1 + x_2$
$t_3 = x_2 + x_3$
etc.

A width W for the entire codeword is also calculated in step 204 by summing the eight integer values $x_0 + x_1 + \ldots + x_7$.

Figures 12, 14A:
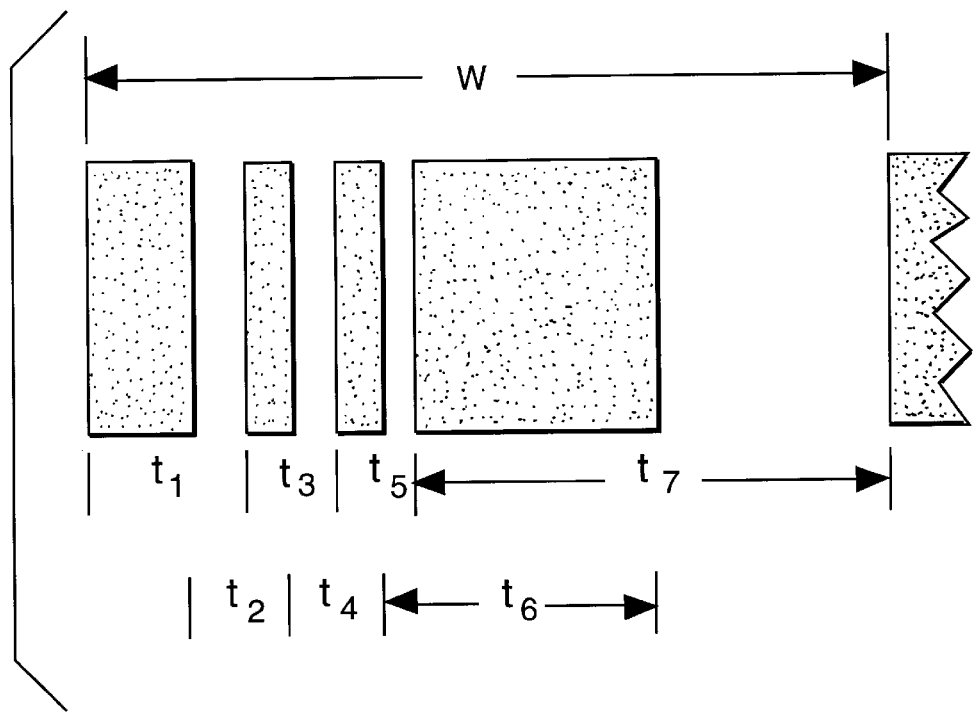

For the codeword in FIG. 12, for example, the sequence of integer values from the scan line, representing the widths of the bars and spaces might be something like: 43, 19, 21, 19, 22, 18, 103, 96. The raw t-sequence $t_1, t_2, \ldots t_7$ would then be 62, 40, 40, 41, 40, 121, 199, and the width W would be 341.

In step 206 in FIG. 11, the raw t-sequence obtained in step 204 is normalized and rounded to integer values. Specifically, a value for the codeword's "module" or "unit" is first established by dividing the width W of the codeword by the total number of units for each codeword. In a PDF417 symbol, each codeword is seventeen units, so that the width W is divided by seventeen to obtain the unit of the codeword. Thus, for the example in FIG. 12, the unit would be (341/17)=20.0. Each value of the raw t-sequence is then divided by the unit and rounded to an integer to normalize the t-sequence. The normalized t-sequence for the codeword in FIG. 12 is 3, 2, 2, 2, 2, 6, 10.

The normalized t-sequence is then Compared to the t-sequences of the start and stop patterns of the code in step 208. If the scanner scans from both left to right and right to left, then the t-sequence must be compared to the start and stop patterns in both their normal and reverse orientations.

If there is a match in step 210, then the index is set in step 214 to a location in the scan line immediately following the pattern if it is a start pattern or immediately preceding it if it is a stop pattern. If the current t-sequence does not match either the start or the stop pattern, however, then in step 212, the index is incremented by one and steps 202 through 210 are repeated until either a match is found or the length of the scan line is exceeded.

Figure 13:
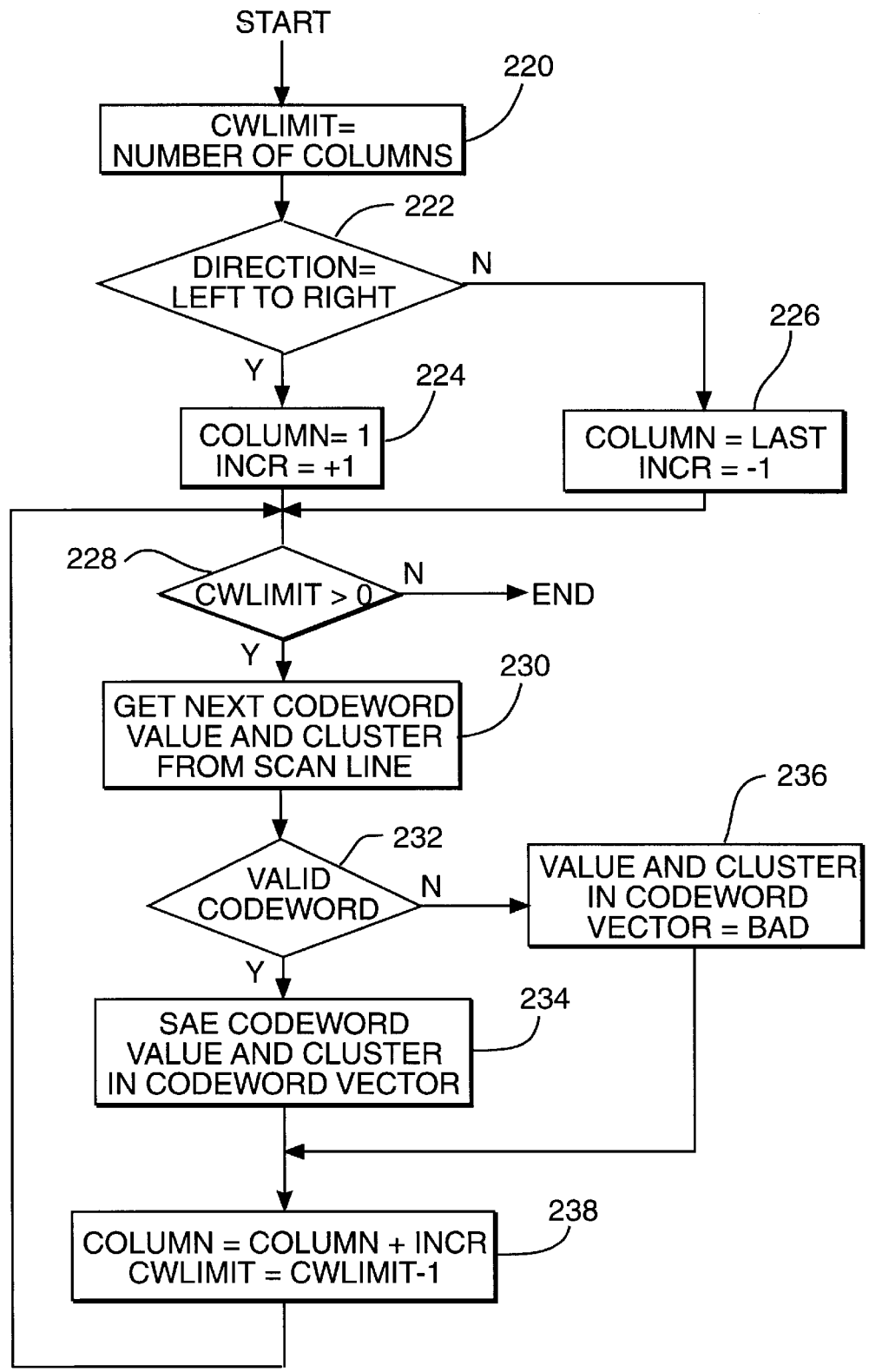
FIG. 13 is a flow diagram of the steps performed by the low-level decoder for decoding a scan line of data into a vector of codeword values and their cluster numbers.

FIG. 13 is a flow chart showing in greater detail the sequence of steps for decoding a scan line of data into a vector of codewords and their clusters as referred to in step 162 of FIG. 9 above. In decoding the individual codeword values and cluster numbers from the scan line, the low-level decoder begins decoding at the start or stop pattern and decodes as many codewords possible. For those codewords that are not successfully decoded, the codeword values in the codeword vector are set to "BAD."

At the completion of the sequence of steps shown in FIG. 13, the codeword vector will contain certain codeword values and cluster numbers in locations corresponding to the appropriate columns of the codewords that were successfully decoded. FIG. 14A shows an example of a codeword vector in which the codewords in eight of the ten columns were successfully decoded. The codeword values in columns 1 and 10 correspond to the left row indicator codeword in row 2 ($L_2$) and the right row indicator codeword in row 1 ($R_1$), respectively. The codewords in columns 5 and 7 were not successfully decoded as indicated by the notation "BAD" in those locations of the codeword vector.

Returning to the first step 220 of FIG. 13, an upper limit on the number of codewords that may be decoded ("cwlimit") is set equal to the number of columns in the codeword matrix. If this number of codewords is successfully decoded, then the decoding process for the current scan line is obviously complete.

Step 222 determines the direction of the scan if the scanner scans from both left to right and right to left. If the particular scan was from left to right as determined in step 222, then the column number of the first codeword is set to "1" in step 224 and the amount that it will incremented by ("incr") each time a subsequent codeword is decoded is set to "+1." If the scan was from right to left, however, then in step 226, the column number of the first codeword in the scan line will be the last column of the codeword matrix, and the incremental value is set to "−1."

Step 228 is the first step of a control loop in which individual codeword values and their cluster numbers are decoded from the scan line of data. In step 228, the codeword limit is tested to see if it is still greater than zero. If not, then all of the codewords in the scan line have been decoded and the loop is exited.

Otherwise, step 230 obtains the next codeword value and its cluster number from the scan line. This step will be discussed in further detail below in connection with FIG. 15.

If the codeword decoded in the previous step is a valid codeword as determined in step 232, then in step 234 the codeword value and its cluster number are saved in the codeword vector at a location corresponding to the column of the codeword. The codeword values thus placed in the codeword vector are ready for incorporation into the codeword matrix.

If the codeword decoded in step 230 is not a valid codeword, however, then the codeword value in the codeword vector corresponding to the current column is set to "BAD" in step 236 to indicate that this codeword was not successfully decoded. A "BAD" codeword is most likely to occur when the scan line crosses the boundary between two rows in the middle of the codeword.

Finally, in step 238, the current column number is either incremented or decremented depending on the direction of the scan, and the codeword limit is decremented by one. Steps 228–236 are then repeated until there has been an attempt to decode all of the codewords in the scan line.

Figure 15:
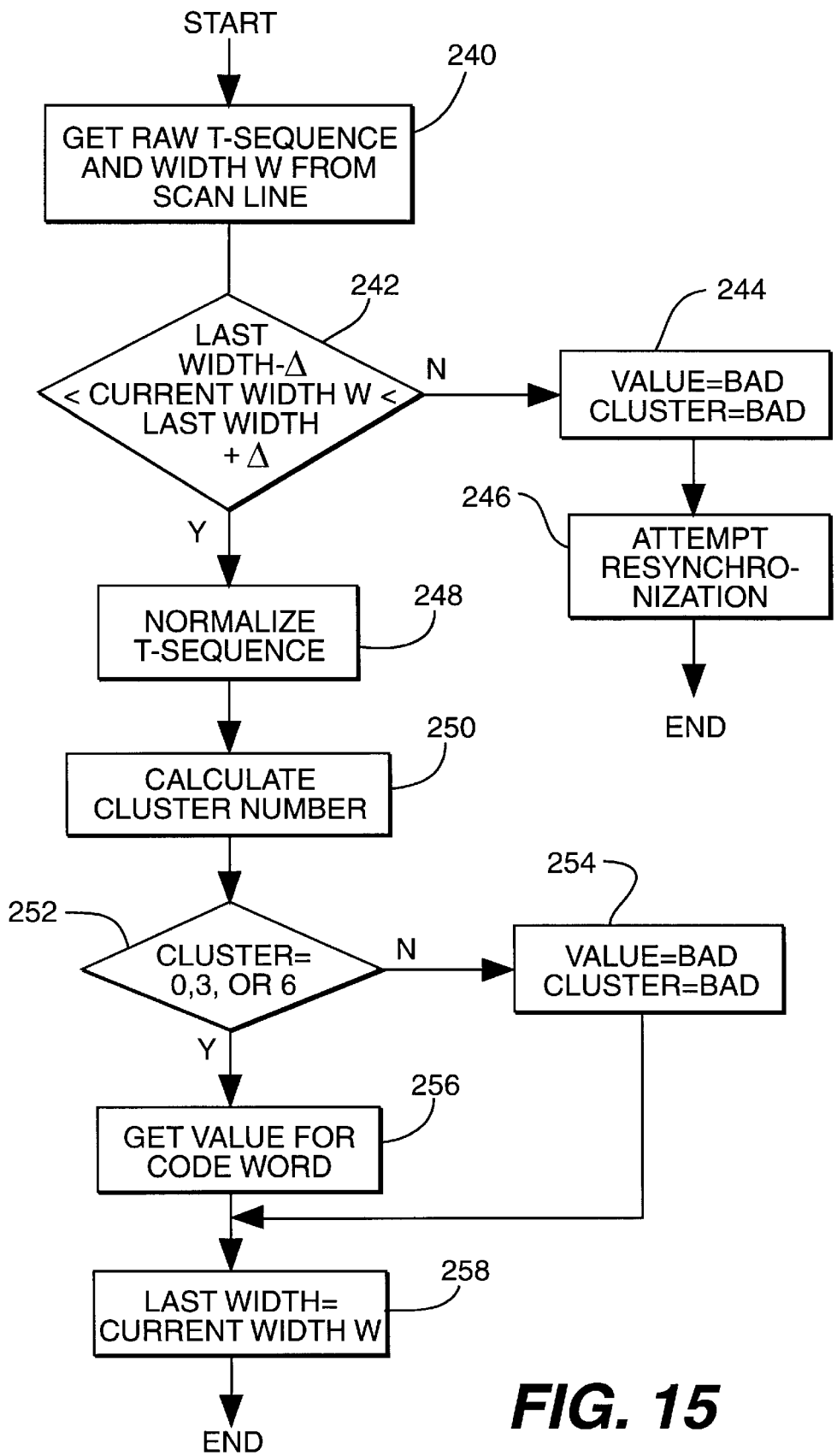
FIG. 15 is a flow diagram of the steps performed by the low-level decoder for decoding an individual codeword value and its cluster number from the scan line data.

FIG. 15 is a flow chart diagram showing the sequence of steps corresponding to step 230 in FIG. 13 and step 172 in FIG. 10 in which an attempt is made to decode an individual codeword value and cluster number from the scan line. In the first step 240, a raw t-sequence and the width W are obtained from the scan line. This same step was discussed previously in connection with step 204 in FIG. 11.

In step 242, the width W of the eight elements presumed to be the next codeword are compared to the width of the previously decoded codeword. If the current width W is not within a range of plus or minus a predetermined difference (delta), then there is probably a split (undercount by a multiple of two elements) or a merge (overcount by a multiple of two elements) error in the current codeword. This codeword is not decoded further, but rather in step 244 its value and cluster number are both set to BAD to indicate that it could not be decoded.

Then in step 246, an attempt is made to resynchronize to the boundary of the next codeword by finding a t-sequence with a corresponding width W that falls within a given tolerance of the expected width of a codeword, based on the width of the previous codeword. If the current width W is significantly greater than the expected width, indicating a possible merge error, then the last two integer values are dropped from the t-sequence until it falls within the proper limits. Likewise, if the current width W is significantly less than the expected width, indicating a possible split error, the next two integer values in the scan line are added to the t-sequence until it falls within the proper limits.

If the current width W is within a certain tolerance of the expected width, as determined in step 242, then an attempt is made to decode the codeword. In step 248, the raw t-sequence is normalized as described above in connection with step 206 in FIG. 11. Then in step 250, the cluster number is determined from the normalized t-sequence. The cluster number may be determined from the t-sequence (as opposed to the X-sequence described above) as follows:

$$\text{cluster number} = (T_1 - T_2 + T_5 - T_6) \bmod 9$$

For codewords in PDF417, valid cluster numbers are 0, 3, and 6. If in step 252 it is determined that the cluster number is not 0, 3, or 6, then the codeword is not valid. Accordingly, in step 254 the cluster number and value are set to "BAD" to indicate that the codeword was not successfully decoded.

Otherwise, in step 256, the normalized t-sequence and its cluster number are used to find the corresponding codeword value in a look-up table. If no corresponding codeword value is found for the t-sequence, then the codeword value is set to "BAD" to indicate that it was not successfully decoded.

Finally, in step 258 the "last width" value is updated to the current width W of the codeword for use in decoding the next codeword value from the scan line.

Figure 16A:
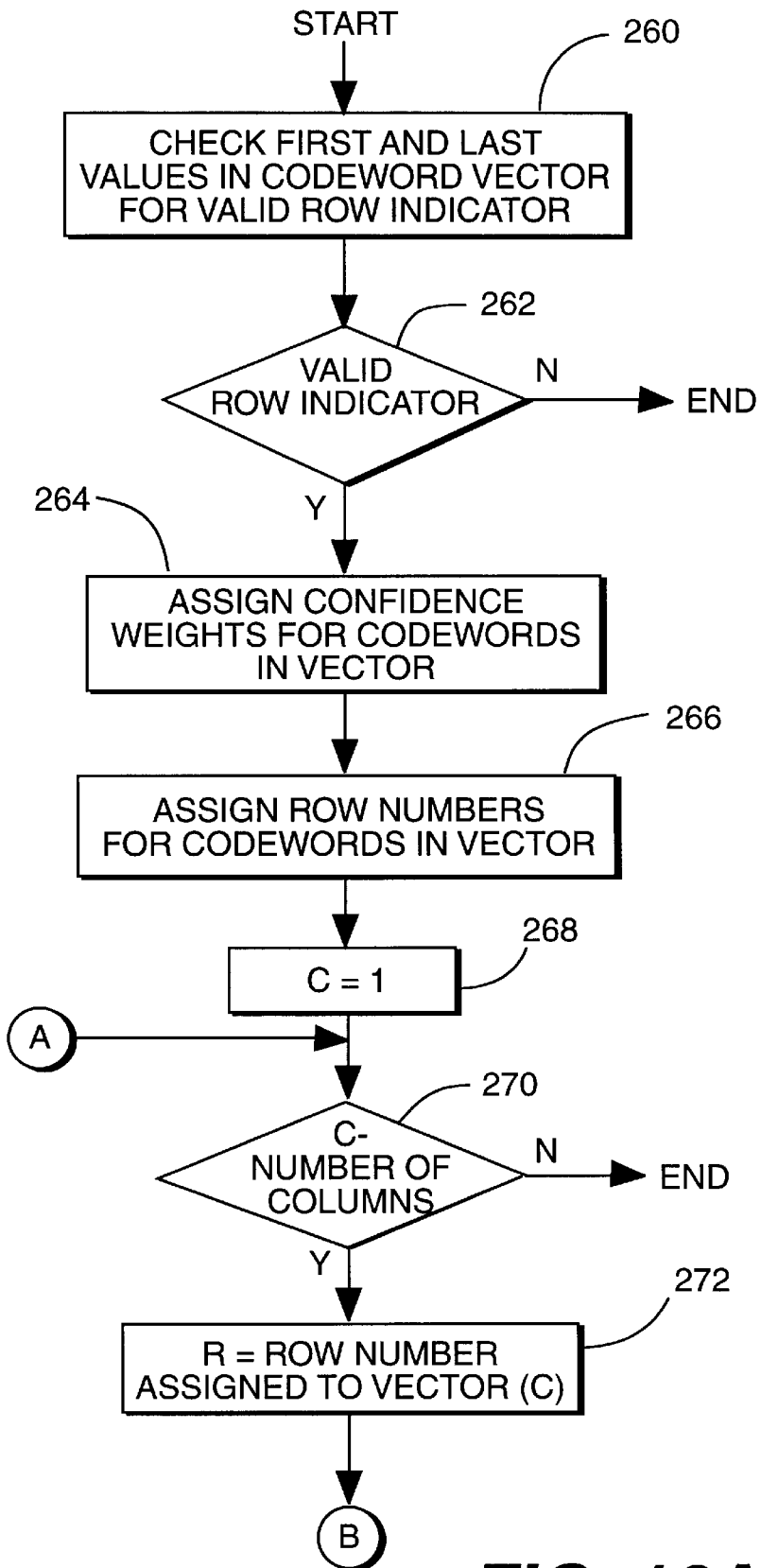
FIGS. 16A and 16B together are a flow diagram of the steps performed by the low-level decoder in order to update the codeword matrix using the codeword vector.
Figure 16B:
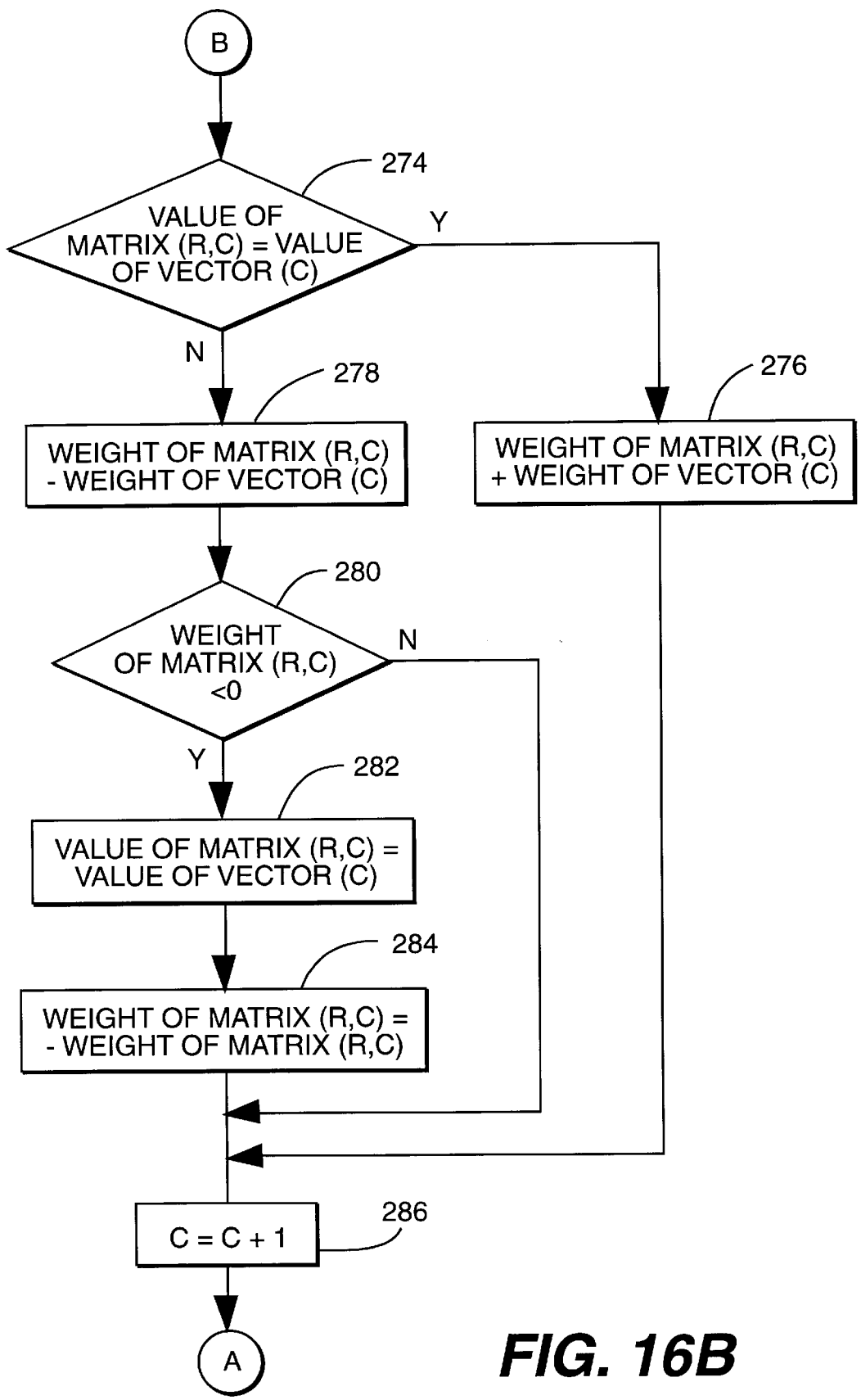

FIGS. 16A and 16B together comprise a flow chart of the sequence of steps executed by the low-level decoder in order to update the codeword matrix using the codeword vector. These figures explain in greater detail step 164 in FIG. 9 discussed above.

The first step 260 of FIG. 16A checks the first and last values in the codeword vector to see if either is a valid row indicator. If neither the first nor the last values in the codeword vector is a valid row indicator, then in step 262 the program exits the routine and no attempt is made to update the codeword matrix using the codeword vector.

If a valid row indicator is present, however, then in step 264 confidence weights are assigned to each codeword value in the codeword vector. Specifically, a confidence weight is assigned to each codeword depending on whether its nearest neighbors and their cluster were also decoded. For example, as shown in FIG. 14B, the codeword values in columns 1, 2, 3, 9, and 10 are assigned high confidence weights ("H") because their immediate neighbors were also successfully decoded and have the same cluster number. The codeword values for columns 4 and 8 are assigned medium confidence weights ("M") because one of their neighbors was successfully decoded and has the same cluster number but the other neighboring codeword value is "BAD." The codeword value in column 3 is assigned a very low confidence weight ("L") because neither of its neighbors was successfully decoded. Thus, the confidence weight for a codeword value at column i in the codeword vector is essentially a function of the cluster numbers of the codewords at columns i–1, i, and i+1. This function may be implemented by a look-up table whose index is calculated from the cluster numbers of the three codewords.

In step 266, a row number is assigned to each codeword value in the codeword vector based on the row indicator codewords and the cluster numbers. As shown in the example in FIG. 14C, the left row indicator codeword $L_2$ indicates that the row number is 2 and the cluster number is 6. The cluster numbers for the codeword values in columns 2–4 are also 6. Therefore, row number 2 is assigned to the codeword values in the first four columns of the codeword vector.

Also in the example in FIG. 14C, columns six and 8–10 all have a cluster number of 3 and the right row indicator codeword $R_1$ indicates that the row number is 1. Therefore, it can be assumed that the scan line crossed the row boundary between row 2 and row 1 and the codeword values in columns 6 and 8–10 should be assigned to row 1.

Once the confidence weights and row numbers have been assigned to each of the codeword values in the codeword vector, the codeword matrix is updated one codeword at a time. In step 268, the column number C of both the codeword vector and the codeword matrix is set is initially set to "1." Step 270 is the first step of an iterative loop which steps through the codewords in the codeword vector and uses them to update the corresponding codewords and their associated confidence weights in the codeword matrix. When the column number C exceeds the number of columns in step 270, then all of the codewords in the codeword vector have been processed and the routine ends.

For each codeword in the codeword vector, step 272 sets the row number R of the codeword matrix to the row number assigned in step 266 to the codeword in the codeword vector at the location C. Thus, for each codeword value in the codeword vector, there is a corresponding value in the codeword matrix at location [R,C].

Continuing in FIG. 16B, step 274 determines whether the current codeword value in location [R,C] in the codeword matrix is the same as the corresponding codeword value in the codeword vector at column C. If the values are the same, then in step 276, the confidence weight assigned to the codeword value in matrix location [R,C] is increased by the confidence weight of the corresponding codeword value in the codeword vector. If not, the confidence weight of the codeword value in the matrix is decreased by the confidence weight of the codeword value in the vector in step 278.

If the confidence weight was decreased in step 278, then in step 280 that confidence weight is tested to see if it was decreased below zero. If the confidence weight is less than zero, then in step 282 the new codeword value in the codeword vector is substituted for the current codeword value in the corresponding location in the codeword matrix. The confidence weight assigned to the codeword value in the matrix is also changed to a positive value in step 284.

Finally, in step 286 the column number C is incremented by 1 for processing the next codeword value in the codeword vector and program control is returned to step 270 for repeating steps 272 through 286 for all of the columns in the vector.

Returning briefly to step 154 in FIG. 9, each time after the codeword matrix has been filled in with the new vector of codeword values and the confidence weights have been updated, an attempt is made to fill in the rest of the matrix using the built-in error correction capability of the symbol. The number and location of codewords which have not yet been successfully decoded may be determined by comparing the confidence weights assigned to each of the codeword values in the matrix with a predetermined threshold. Those values having confidence weights below the threshold are considered to not yet be decoded. If the number of codewords not yet decoded is less than the error correction capability of the symbol as determined by the security level, then an attempt is made to correct the matrix.

It will be apparent to those skilled in the art that various modifications and variations can be made in the decoding method and apparatus without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A bar code reader system, comprising:
    a record having a substrate with an information area containing first data removably encoded on the substrate in an error-correctable machine readable format and text;
    a bar code reader for converting the first encoded data from the record into electrical signals;
    decoding means for decoding the electrical signals corresponding to the first encoded data;
    processing means for encoding second data entered through an entering means, said processing means generating transfer drive signals for controlling the transfer of said second encoded data onto said record;
    transferring means for detecting whether the record contains said first encoded data;
    erasing means, in response to said drive signals when said first encoded data is detected on the record, for subjecting the record to an erasing operation to remove said first encoded data from said record;
    bypassing means for bypassing the erasing operation performed by the erasing means when said first encoded data is not detected on the record; and
    printing means for printing said second encoded data on said record.

2. The bar code system of claim 1 wherein the erasing means includes means for removing from the record the first encoded data independent of the substrate on which said first data is encoded.

3. The bar code system of claim 1 wherein the first and second encoded machine readable data includes a two-dimensional bar code format that includes a plurality of ordered, adjacent rows of codewords of bar-coded information from a set of codewords.

4. The bar code system of claim 1 wherein the first and second encoded machine readable data, comprises a two-dimensional bar code in PDF417 format.

5. The bar code system of claim 1 wherein the printing means comprises
    means for printing the first and second encoded data in erasable ink.

6. The bar code system of claim 5 wherein the erasing means comprises
    means for erasing the first encoded data and for drying an area of the record underlying the erased data.

7. The bar code system of claim 1 wherein the printing means includes means for printing the second encoded machine readable data on a label removably attached to the record.

8. The bar code system of claim 1 wherein the reader comprises:
    means for reading two-dimensional bar code symbol data in PDF417 format from a removable label applied to said record; and
    decoding means for generating item-related information signals derived from said read two-dimensional bar code data.

9. The bar code system of claim 1 wherein the first and second bar code data comprises:
    a plurality of ordered, adjacent rows of codewords of bar-coded information from a set of codewords, the set of codewords being partitioned into at least three mutually exclusive clusters, each row in the symbol having at least one row indicator codeword and containing only codewords from a cluster different from the codewords in an adjacent row.

10. The bar code system of claim 1 wherein the decoding means comprises:
    means for scanning a two-dimensional bar code symbol to produce scan lines of data representing bar-coded information in the codewords of the symbol,
    means for decoding a scan line of data into a vector of codeword values corresponding to the codewords that were scanned, at least one of the codeword values being for a row indicator codeword,
    means for assigning a row number to each of the codeword values in a vector based on the value of the row indicator codeword and a cluster of the codeword, and
    means for filling in a codeword matrix with the codeword values in the vector according to their assigned row numbers.

11. The bar code system of claim 10 wherein the at least one row indicator codeword contains information regarding the number of rows in the symbol and the number of codewords in each row, and wherein the decoding means includes:
    means for decoding a scan line of data to obtain a codeword value of a row indicator codeword, and
    means for determining one of the number of rows and the number of codewords in each row from the codeword value for the row indicator codeword.

12. The bar code system of claim 10, wherein each row of the symbol contains a start and a stop pattern of bar-coded information, and wherein the means for decoding a scan line of data in said decoding means includes means for locating a sequence of data in the scan line corresponding to one of the start and the stop patterns.

13. The bar code system of claim 10, wherein the symbol contains at least one error correction codeword and the row indicator codewords contain information regarding the number of rows in the symbol, the number of codewords in each row, and the number of error correction codewords, and
    wherein the decoding means comprises
    means for decoding a scan line of data to obtain a codeword value for a row indicator codeword,
    means for determining a value for one of the number of rows, the number of codewords in each row, and the number of error correction codewords from the codeword value for the row indicator codeword,
    means for adjusting a confidence weight for a corresponding one of the number of rows, the number of codewords in each row, and the number of error correction codewords based on the value determined in the preceding step and a previous value obtained by decoding a row indicator codeword, and means for initializing the codeword matrix when the confidence weights for the number of rows, the number of codewords in each row, and the number of error correction codewords all exceed a predetermined threshold.

14. The bar code system of claim 1 wherein the record is a charge card, and the first and second encoded data relate to remaining available credit.

15. The bar code system of claim 1 wherein the record in an admission ticket to multiple events and the first and second encoded data relate to the identification of unused multiple events.

16. The bar code system of claim 1 wherein the record is a medical record for a designated individual and the first and second encoded data relates to health matters of the individual.

17. A method for reading data from a record having a substrate with an information area containing first data removably encoded on the substrate in an error-correctable machine readable format and text, comprising the steps of:

converting the first encoded data from the record into electrical signals;

decoding the electrical signals corresponding to the first encoded data;

receiving second data;

encoding said second data;

generating transfer drive signals for controlling the transfer of said second encoded data onto said record;

detecting whether the record contains said first encoded data;

subjecting the record to an erasing operation to remove said first encoded data from said record in response to said drive signals when said first encoded data is detected on the record;

bypassing the subjecting step when said first encoded data is not detected on the record; and printing said second encoded data on said record.

18. A method for reading data from a record having a substrate with an information area containing first data removably encoded on the substrate in an error-correctable machine readable format and text, comprising the steps of:

receiving second data;

encoding the second data;

generating transfer drive signals for controlling the transfer of the second encoded data onto the record;

detecting whether the record contains the first encoded data;

frictionally removing the first encoded data from the record by using material independent of the first encoded data in response to the drive signals when the first encoded data is detected on the record;

bypassing the frictionally removing step when the first encoded data is not detected on the record; and printing the second encoded data on the record.

19. A method for reading data from a record having a substrate with an information area containing first data removably and directly imprinted on the substrate in an error-correctable machine readable format and text, comprising the steps of:

receiving second data;

encoding the second data;

generating transfer drive signals for controlling the transfer of the second encoded data onto the record;

detecting whether the record contains the first data;

eliminating the first data from the substrate on which the first data is directly imprinted in response to the drive signals when the first data is detected on the record;

bypassing the eliminating step when the first data is not detected on the record; and printing the second encoded data on the record.

20. A method for reading data from a record having a substrate with an information area containing first data removably encoded on the substrate in an error-correctable machine readable format and text, comprising the steps of:

receiving second data;

encoding the second data;

generating transfer drive signals for controlling the transfer of the second encoded data onto the record;

detecting whether the record contains the first encoded data;

creating an area within the information area of the record for printing the second encoded data in response to the drive signals when the first encoded data is detected on the record;

bypassing the creating step when the first encoded data is not detected on the record; and printing the second encoded data on the record.

21. A method for reading data from a record having a substrate with an information area containing first data removably encoded on the substrate in an error-correctable machine readable format and text, comprising the steps of:

receiving second data;

encoding the second data;

generating transfer drive signals for controlling the transfer of the second encoded data onto the record;

detecting whether the record contains the first encoded data;

chemically altering the first encoded data on the record in response to the drive signals when the first encoded data is detected on the record;

bypassing the chemically altering step when the first encoded data is not detected on the record; and printing the second encoded data on the record.

22. A method for reading data from a record having a substrate with an information area containing first data removably and directly imprinted on the substrate in an error-correctable machine readable format and text, comprising the steps of:

receiving second data;

encoding the second data;

generating transfer drive signals for controlling the transfer of the second encoded data onto the record;

detecting whether the record contains the first data;

changing the substrate on which the first data is directly imprinted sufficient to make the first data unreadable in response to the drive signals when the first data is detected on the record;

bypassing the changing step when the first data is not detected on the record; and altering the substrate sufficient to make the second encoded data readable.

23. A method for reading data from a record having a substrate with an information area containing first data removably encoded on the substrate in an error-correctable machine readable format and text, comprising the steps of:
  receiving second data;
  encoding the second data;
  generating transfer drive signals for controlling the transfer of the second encoded data onto the record;
  detecting whether the record contains the first encoded data;
  erasing the first encoded data from the record by using material independent of the first encoded data in response to the drive signals when the first encoded data is detected on the record;
  bypassing the erasing step when the first encoded data is not detected on the record; and
  printing the second encoded data on the record.

* * * * *